United States Patent
Tanizoe

(10) Patent No.: US 7,898,581 B2
(45) Date of Patent: Mar. 1, 2011

(54) IMAGE PICKUP APPARATUS WITH NOISE REDUCTION UNIT

(75) Inventor: Yukihiro Tanizoe, Osaka (JP)

(73) Assignee: Panasonic Corporation, Osaka (JP)

( * ) Notice: Subject to any disclaimer, the term of this patent is extended or adjusted under 35 U.S.C. 154(b) by 733 days.

(21) Appl. No.: 11/745,714

(22) Filed: May 8, 2007

(65) Prior Publication Data

US 2007/0257997 A1 Nov. 8, 2007

(30) Foreign Application Priority Data

May 8, 2006 (JP) .............................. 2006-128799

(51) Int. Cl.
*H04N 5/217* (2011.01)
*H04N 5/225* (2006.01)

(52) U.S. Cl. .................. 348/241; 348/220.1; 348/222.1

(58) Field of Classification Search ................. 348/241, 348/220.1

See application file for complete search history.

(56) References Cited

U.S. PATENT DOCUMENTS

| | | | | |
|---|---|---|---|---|
| 4,748,498 A | * | 5/1988 | Yamanishi et al. | 348/622 |
| 5,043,817 A | * | 8/1991 | Kinugasa et al. | 348/240.2 |
| 5,521,636 A | * | 5/1996 | Nakayama et al. | 348/222.1 |
| 6,982,755 B1 | * | 1/2006 | Kikuzawa | 348/241 |
| 7,468,749 B2 | * | 12/2008 | Hirakoso | 348/252 |
| 7,602,425 B2 | * | 10/2009 | Ishii | 348/240.1 |
| 2003/0098915 A1 | * | 5/2003 | Hyodo et al. | 348/252 |

FOREIGN PATENT DOCUMENTS

| | | |
|---|---|---|
| JP | 11-41491 | 2/1999 |
| JP | 2001-45334 | 2/2001 |
| JP | 2006-14075 | 1/2006 |

* cited by examiner

*Primary Examiner*—Ngoc-Yen T Vu
(74) *Attorney, Agent, or Firm*—Hamre, Schumann, Mueller & Larson, P.C.

(57) ABSTRACT

An image pickup apparatus comprises an image pickup element that includes a plurality of photoelectric conversion elements, and is operable in a first drive mode for reading a low resolution image based on an output of the photoelectric conversion elements or a second drive mode for reading a higher resolution image than the low resolution image, a drive unit that drives the image pickup element, a frame memory that stores image data read by the image pickup element in the first drive mode, an image enlarging portion that enlarges an image size of the image data stored in the frame memory, and a noise reduction unit that performs noise reduction on image data read by the image pickup element in the second drive mode, based on the image data enlarged by the image enlarging portion. This configuration enables high frame rate moving images to be obtained. Further, degradation of image resolution can be prevented, and random noise contained in images can be suppressed.

6 Claims, 17 Drawing Sheets

(a) Input image data (b) Enlarged image data (c) Output of first subtractor (d) Output of attenuator (e) Output of second subtractor (a) Input image data (b) Output of frame memory 9

(c) Output of first subtractor 5

(d) Output of attenuation unit 7

(e) output of second subtractor 6

IMAGE PICKUP APPARATUS WITH NOISE REDUCTION UNIT

BACKGROUND OF THE INVENTION

1. Field of the Invention

The present invention relates to an image pickup apparatus having a function of suppressing random noise produced by an image pickup element or the like.

2. Description of Related Art

A CCD image sensor, which is an exemplary image pickup element, includes photoelectric conversion elements arranged in a matrix, a transfer unit that transfers charge output from the photoelectric conversion elements, and an amplifier that amplifies the voltage of the charge transferred by the transfer unit and outputs an image signal.

Currently, with image pickup elements widely used in digital still cameras and video cameras, the amount of charge that can be stored in a single photoelectric conversion element is decreasing due to increased miniaturization and higher pixel counts. While pixel sensitivity drops when the amount of stored charge decreases, sensitivity can be raised by increasing the amplification factor of the amplifier. However, raising the amplification factor of the amplifier also amplifies the noise component contained in the charge output from the photoelectric conversion elements. The amplified noise component appears as random noise in the image, and degrades the signal-to-noise (S/N) ratio of the image. Hereinafter, techniques for suppressing random noise will be described.

[1. Low Pass Filtering using a Two-Dimensional Filter]

A variety of techniques already have been proposed for suppressing random noise. For example, patent document 1 (JP H11-41491A) discloses a method for suppressing random noise by performing low pass filtering (LPF) using a two-dimensional filter.

FIG. 16 shows the configuration of a random noise suppression circuit using a two-dimensional filter. When image data is input from an input terminal 41, a synchronization unit 42 synchronizes the target pixel and the eight pixels above, below and diagonally adjacent thereto (neighboring pixels). The image data synchronized by the synchronization unit 42 is output to subtraction units 431 to 438.

FIG. 17 is a schematic diagram showing the concept behind the synchronization in the synchronization unit 42, with the two-dimensional array of pixels in the image pickup element being shown schematically. Since the neighboring pixels $a_{i-1,j-1}$, $a_{i-1,j}$, $a_{i-1,j+1}$, $a_{i,j-1}$, $a_{i,j+1}$, $a_{i+1,j-1}$, $a_{i+1,j}$ and $a_{i+1,j+1}$, given a target pixel $a_{i,j}$, cannot be read at the same time as the target pixel, the neighboring pixels are synchronized with the target pixel after being read out, and are then output to the subtraction units 431 to 438.

In FIG. 16, the subtraction units 431 to 438 calculate the difference between the target pixel and each neighboring pixel, and output the calculated differences to correlation detector units 441 to 448. The correlation detector units 441 to 448 detect whether there is a correlation between the target pixel and each neighboring pixel and output the detection results to a counter 45. A correlation is judged to exist if, for example, the absolute value of a difference output from the subtraction units 431 to 438 is smaller than a threshold. Note that in the following description neighboring pixels judged to be correlated with the target pixel are called "correlated pixels", and neighboring pixels judged not to be correlated with the target pixel are called "uncorrelated pixels".

The counter 45 identifies correlated pixels, and notifies information identifying the correlated pixels to a selector 46. The counter 45 also outputs the number of correlated pixels to a number generator 49.

The selector 46 replaces the value of uncorrelated pixels in the output of the synchronization unit 42 with zeros, and outputs the result to an adder 47.

The adder 47 adds the output of the selector 46 and outputs the result to a dividing portion 48.

The number generator 49 adds 1 to the number of correlated pixels output from the counter 45, and outputs the result to the dividing portion 48.

The dividing portion 48 divides the output of the adder 47 by the number output from the number generator 49, and outputs the result to an output terminal 50. Here, since the output of the number generator 49 is the number of pixels added by the adder 47, the output of the dividing portion 48 is the average value of the target pixel and the correlated pixels.

As a result of the above processing, an output is obtained in which random noise of smaller amplitude than the threshold set by the correlation detector units 441 to 448 is suppressed. Also, since low pass filtering using a two-dimensional filter is not performed if the amplitude at the edge of the subject is greater than the threshold set by the correlation detector units 441 to 448, blurring of the edge of the image can be prevented.

[2. Mixed Pixel Reading Method]

Patent document 2 (JP 2006-14075A) discloses a mixed pixel reading method in which pixels are read after being added by an image pickup element.

FIG. 18 is a schematic diagram showing exemplary pixel combinations when reading pixels with the mixed pixel reading method. With this mixed pixel reading method, pixels two removed from pixels 61 to 66 (target pixels) in the vertical, lateral and diagonal directions (eight pixels in all) are added and the resultant values are read. If pixel 61 is the target pixel, for example, the eight neighboring pixels 61a to 61h are added to pixel 61 and the resultant value is then read as the pixel signal of pixel 61. Similar processing is performed on pixels 62 to 66, and the resultant values are read as pixel signals.

A mixed pixel reading method such as this enables an image signal with suppressed random noise to be obtained. Also, since pixels are read by the image pickup element after being decimated, the number of read pixels decreases, enabling high speed reading of pixels.

[3. Cyclic Noise Reduction Method]

Patent document 3 (JP 2001-45334A) discloses a cyclic noise reduction method using frame memory.

FIG. 19 is a block diagram showing an exemplary cyclic noise reduction circuit using frame memory. A subtracter 75 computes the difference between image data input from an input terminal 71 and image data of the previous frame read from a frame memory 79, and outputs the result to an attenuation unit 77. The attenuation unit 77 attenuates the image data output from the subtracter 75 by performing a nonlinear process thereon.

FIG. 20 shows the input/output characteristics of the attenuation unit 77. If the absolute value of the difference between the image data input from an input terminal 71 and the image data of the previous frame is less than a threshold Th, the output of the attenuation unit 77 is attenuated to 50%. If the absolute value of the difference exceeds the threshold Th, the output of the attenuation unit 77 is attenuated by more. If the absolute value of the difference exceeds a threshold Th2, the output of the attenuation unit 77 will be zero.

The image data output from the attenuation unit 77 is input to a subtracter 76. The subtracter 76 subtracts the image data output from the attenuation unit 77 from the image data input to the input terminal 71. The image data output from the subtracter 76 is written to a frame memory 79, as well as being output from an output terminal 72.

That is, if the absolute value of the difference between the image data input to the input terminal 71 and the image data of the previous frame is small, the difference can be judged to be random noise. Consequently, subtracting the random noise component output from the attenuation unit 77 from the image data input to the input terminal 71 with the subtracter 76 enables random noise contained in the image data input to the input terminal 71 to be suppressed.

If the absolute value of the difference between the image data input to the input terminal 71 and the image data of the previous frame is large, it is possible to judge that there is motion in the subject. Consequently, the occurrence of a residual image in the portion where motion occurs is prevented by outputting the image data input to the input terminal 71 from the output unit 72 without modification.

Repeatedly performing the above processing on a plurality of frames of input image data enables image data with suppressed random noise to be obtained.

However, with low pass filtering using a two-dimensional filter as disclosed in patent document 1 or a mixed pixel reading method as disclosed in patent document 2, resolution degradation is a problem.

Also, the random noise suppression effect resulting from low pass filtering using a two-dimensional filter is limited by the number of taps in the filter, thereby requiring more taps to obtain a greater effect. The problem is that increasing the number of taps increases the circuitry size.

Further, with a cyclic noise reduction method as disclosed in patent document 3, not many frames can be read by the image pickup element per unit of time when still images are shot using an image pickup element with a large number of pixels, thereby reducing the quality of moving images.

SUMMARY OF THE INVENTION

An object of the present invention is to realize an image pickup apparatus that is able to suppress random noise and process high frame rate moving images, and to obtain high resolution still images. A further object of the present invention is to realize such an image pickup apparatus with a simple configuration.

An image pickup apparatus of the present invention comprises an image pickup element that includes a plurality of photoelectric conversion elements, and is operable in a first drive mode for reading a low resolution image based on an output of the photoelectric conversion elements or a second drive mode for reading a higher resolution image than the low resolution image, a drive unit that drives the image pickup element, a frame memory that stores image data read by the image pickup element in the first drive mode, an image enlarging portion that enlarges an image size of the image data stored in the frame memory, and a noise reduction unit that performs noise reduction on image data read by the image pickup element in the second drive mode, based on the image data enlarged by the image enlarging portion.

DETAILED DESCRIPTION OF THE INVENTION

Embodiment 1

[1. Configuration of Image Pickup Apparatus]

Figure 1:
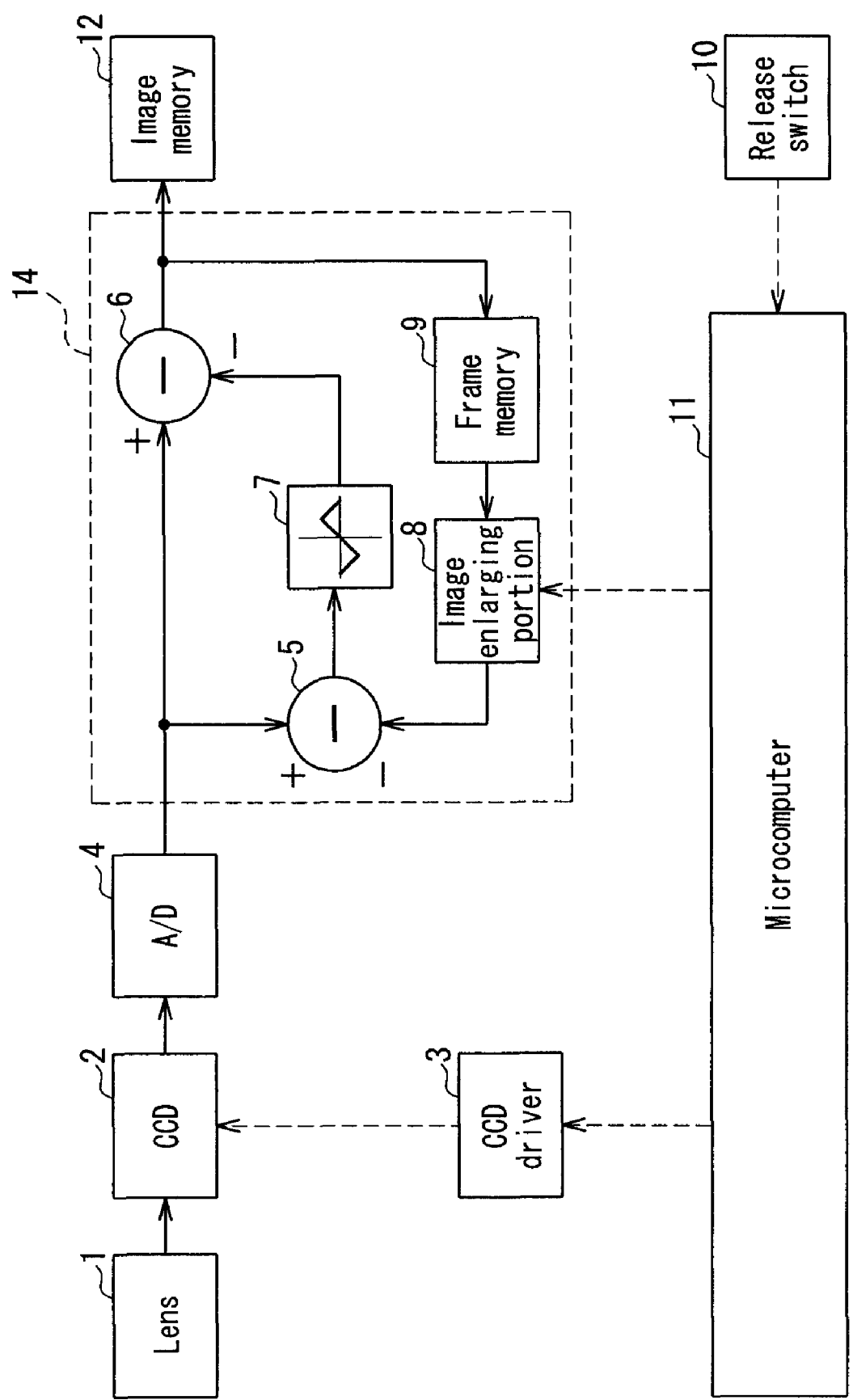
FIG. 1 is a block diagram of an image pickup apparatus according to embodiment 1.

FIG. 1 is a block diagram showing the configuration of an image pickup apparatus according to embodiment 1. The image pickup apparatus includes a lens 1, a CCD image sensor 2, a CCD driver 3, an analog-digital conversion unit 4 (hereinafter, A/D conversion unit), a release switch 10, a microcomputer 11, an image memory 12, and a noise reduction circuit 14.

The CCD image sensor 2, which includes a large number of photoelectric conversion elements in a matrix, converts an optical image incident via the lens 1 to an electrical image and outputs the electrical image. The CCD image sensor 2 can operate in pixel mixing mode (first drive mode) or all-pixel reading mode (second drive mode). Pixel mixing mode is a mode in which a plurality of horizontally and vertically arrayed pixels are added and output, and effectively involves decimating the pixels to reduce resolution. All-pixel reading mode is a mode in which pixel signals from all of the photoelectric conversion elements are output without being decimated.

The CCD driver 3 is able to drive the CCD image sensor 2 as a result of control signals output from the microcomputer 11. Specifically, the CCD driver 3 controls the CCD image sensor 2 to operate in pixel mixing mode or all-pixel reading mode, and controls an exposure operation performed by the CCD image sensor 2.

The microcomputer 11 (control unit) instructs the CCD driver 3 to switch between pixel mixing mode and all-pixel reading mode. When in pixel mixing mode, pixel signals are read in which the number of pixels in the vertical and horizontal directions has been decimated to one-third in comparison with all-pixel reading mode, since pixel signals are read after being mixed in the combinations shown in FIG. 18 mentioned above. The microcomputer 11 also is able to specify the magnification of an image enlarging portion 8. Further, the microcomputer 11 controls the operations of the CCD driver 3 and the image enlarging portion 8 as a result of a control signal output from the release switch 10.

The noise reduction circuit 14 includes a first subtracter 5, a second subtracter 6, an attenuation unit 7, an image enlarging portion 8, and a frame memory 9. The noise reduction circuit 14 reduces the noise component in image data output from the A/D conversion unit 4.

The image memory 12 saves image data output from the noise reduction circuit 14. Images based on the image data saved in the image memory 12 can be displayed on a monitor (not shown) mounted on the image pickup apparatus.

Note that in the following description the magnification when enlarging or reducing image data is based on the size (1×) of images output when the CCD image sensor 2 is operating in pixel mixing mode.

The operations are described next.

The image signal (analog signal) output from the CCD image sensor 2 is digitized by the A/D conversion unit 4. Image data output from the A/D conversion unit 4 is input to the first subtracter 5 and the second subtracter 6. The first subtracter 5 subtracts the image data output from the image enlarging portion 8 (image of previous frame) from the image data output from the A/D conversion unit 4 (current image), and outputs the difference data to the attenuation unit 7. The attenuation unit 7 attenuates the image data by performing a nonlinear process thereon based on the characteristics shown in FIG. 20, for example. The image data output from the attenuation unit 7 is input to the second subtracter 6. The second subtracter 6 subtracts the image data output from the attenuation unit 7 from the image data output from the A/D conversion unit 4. The image data output from the second subtracter 6 is written to the frame memory 9, as well as to the image memory 12.

The image data written to the frame memory 9 is read after one frame has elapsed and input to the image enlarging portion 8. The image enlarging portion 8 enlarges the image size of the image data read from the frame memory 9 by duplicating single pixels or performing linear interpolation from a plurality of pixels under the control of the microcomputer 11. The image data enlarged by the image enlarging portion 8 is input to the first subtracter 5. Similar operations to the above are performed thereinafter.

Figure 19:
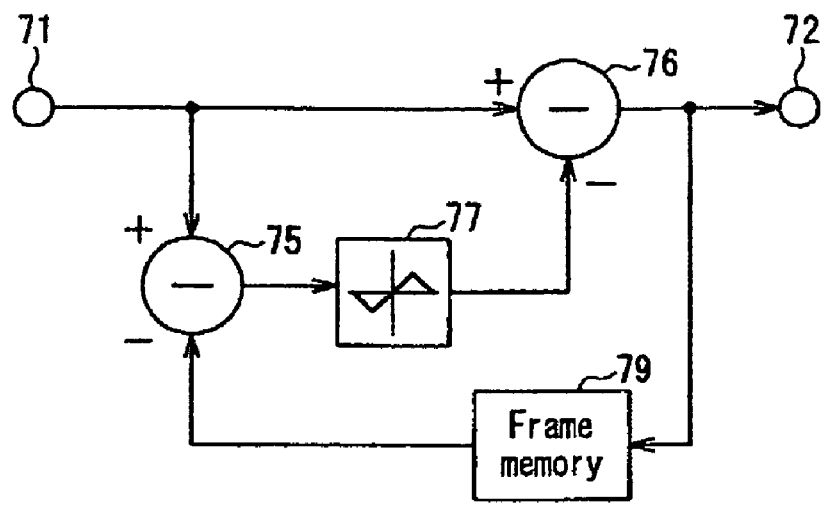
FIG. 19 is a block diagram showing an exemplary cyclic noise reduction circuit.

Note that if the magnification in the image enlarging portion 8 is set to 1×, the operations will be the same as the cyclic noise reduction circuit shown in FIG. 19 mentioned above, since the image data read from the frame memory 9 is output without modification. The first subtracter 5, the second subtracter 6 and the attenuation unit 7 form an exemplary noise reduction unit according to the present invention.

[2. Image Capture Operations]

Figure 2:
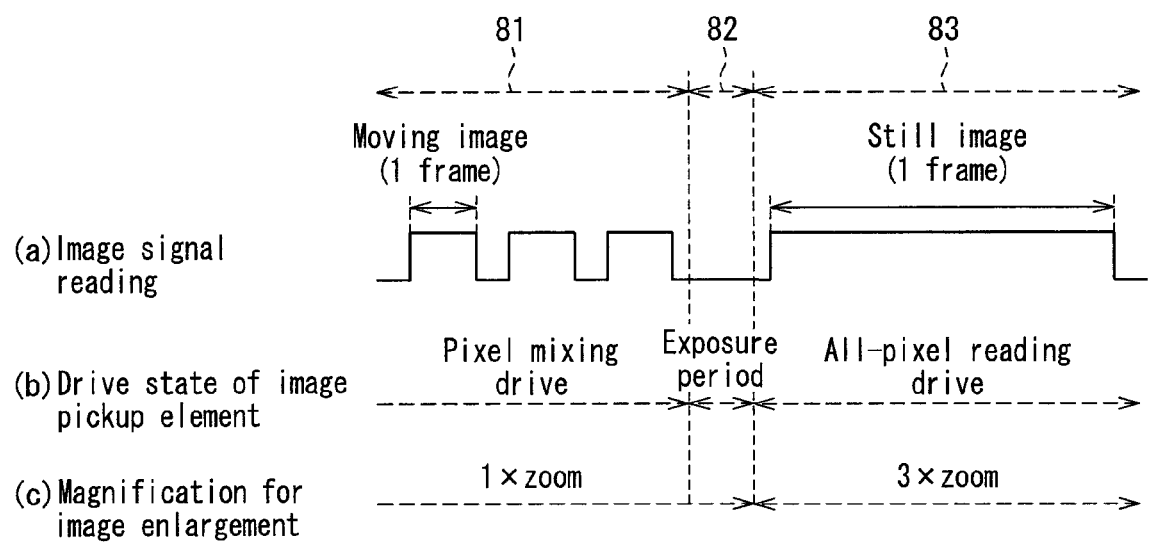
FIG. 2 is a timing chart of the image pickup apparatus according to embodiments 1 and 2.

FIG. 2 shows the state of various units when displaying moving images on the monitor (monitor state) and when capturing still images in the image pickup apparatus of the present embodiment. FIG. 2(a) shows the pixel signal reading state in the CCD image sensor 2, with pixel signals being read in the high period. FIG. 2(b) shows the driving state of CCD image sensor 2. FIG. 2(c) shows the magnification set in the image enlarging portion 8.

Firstly, while the release switch 10 is not being operated, the microcomputer 11 controls the CCD driver 3 to drive the CCD image sensor 2 in pixel mixing mode, as shown in period 81 of FIG. 2. The microcomputer 11 also sets the magnification in the image enlarging portion 8 to 1×.

One frame worth of image signal is output from the CCD image sensor 2 in a prescribed cycle. The image signal output from the CCD image sensor 2 is input to the A/D conversion unit 4. The A/D conversion unit 4 digitizes the image signal and outputs image data. The image data output from the A/D conversion unit 4 is written to the image memory 12 via the second subtracter 6. Images based on the image data written to the image memory 12 are output sequentially to the monitor (not shown). Moving images (so-called through-the-lens images) are thereby displayed on the monitor. At this time, the CCD image sensor 2, which is operating in pixel mixing mode, outputs an image signal (frames) in which pixels have been decimated in the horizontal and vertical directions. Thus, a high frame rate can be set because of the small image size per frame, enabling smooth moving images to be displayed on the monitor.

Here, the image data output from the A/D conversion unit 4 undergoes random noise suppression in the second subtracter 6 and is written to the frame memory 9. Image data read from the frame memory 9 after one frame has elapsed is input to the first subtracter 5 via the image enlarging portion 8. The image enlarging portion 8 outputs the image data read from the frame memory 9 without changing the image size, since the magnification is set to 1×. The first subtracter 5 subtracts the image data (image size=1×) output from the image enlarging portion 8 from the image data (image size=1×) output from the A/D conversion unit 4, and outputs the difference data. The image data output from the first subtracter 5 is input to the attenuation unit 7. The attenuation unit 7 attenuates the image data based on the characteristics shown in FIG. 20, and outputs the result. The second subtracter 6 subtracts the image data output from the attenuation unit 7 from the image data output from the A/D conversion unit 4. Image data with suppressed random noise thereby is output from the second subtracter 6.

Next, when the release switch 10 is operated, the microcomputer 11 controls the CCD driver 3 to cause the CCD image sensor 2 to execute the exposure operation, as shown in period 82. After the end of period 82, the microcomputer 11 controls the CCD driver 3 to cause the CCD image sensor 2 to stop the exposure operation.

Next, the microcomputer 11 controls the CCD driver 3 to drive the CCD image sensor 2 in all-pixel reading mode, as shown in period 83. The CCD driver 3 drives the CCD image sensor 2 in all-pixel reading mode for one frame. The microcomputer 11 also sets the magnification in the image enlarging portion 8 to 3×.

The image signal output from the CCD image sensor 2 operating in all-pixel reading mode is digitized by the A/D conversion unit 4, and image data is output. The image data output from the A/D conversion unit 4 is input to the first subtracter 5 and the second subtracter 6.

On the other hand, there is one frame of pre-exposure image data (image size=1×) stored in the frame memory 9.

After the exposure shown in period 82 has ended, the image data read from the frame memory 9 is enlarged to 3× in the image enlarging portion 8. The image data (image size=3×) output from the image enlarging portion 8 is input to the first subtracter 5.

The first subtracter 5 subtracts the image data enlarged by the image enlarging portion 8 from the image data output from the A/D conversion unit 4, and outputs the difference data. The image data output from the first subtracter 5 is input to the attenuation unit 7. Note that since an image enlarged to 3× in the image enlarging portion 8 is the same size as an image read by the CCD image sensor 2 in all-pixel reading mode, appropriate difference data can be obtained in the first subtracter 5.

Figure 20:
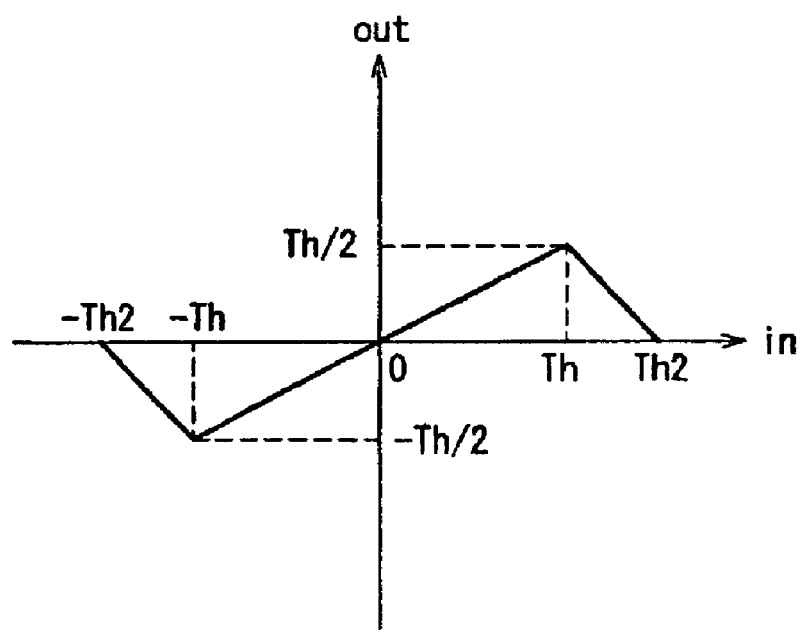
FIG. 20 shows the input/output characteristics of an attenuation unit.

The attenuation unit 7 attenuates the image data (difference) by performing a nonlinear process thereon based on the characteristics shown in FIG. 20. The image data output from the attenuation unit 7 is input to the second subtracter 6.

The second subtracter 6 subtracts the image data output from the attenuation unit 7 from the image data output from the A/D conversion unit 4. The image data output from the second subtracter 6 is written to the image memory 12. A display control unit (not shown) displays a still image on the monitor (not shown) based on the image data written to the image memory 12.

Here, any difference data (difference) obtained by subtracting the output of the A/D conversion unit 4 from the output of the image enlarging portion 8 that appears in a portion of the image in which there is little temporal change is viewed as random noise. If the amplitude of random noise is small, the difference will fall in the range from −Th2 to Th2 shown in FIG. 20. Thus, image data with suppressed random noise can be obtained as a result of the second subtracter 6 subtracting the random noise component from the image data output from the A/D conversion unit 4.

On the other hand, if the amplitude of the difference input to the attenuation unit 7 falls outside the range from threshold Th2 to −Th2 shown in FIG. 20, the difference output from the attenuation unit 7 will be zero. This is because the difference derives, not from noise, but from a portion of the image in which there is a large temporal change. Thus, the occurrence of a residual image in the image is prevented as a result of the second subtracter 6 outputting the image data input from the A/D conversion unit 4 without modification.

Once the random noise suppression has been completed, the image pickup apparatus returns again to the state shown in period 81. That is, the state of moving images being displayed on the monitor.

[3. Effects of Embodiment and Related Matters]

According to the present embodiment, moving images are displayed based on image data read in pixel mixing mode, thereby enabling high frame rate moving images to be obtained.

Also, random noise can be suppressed in pixel mixing mode without reducing resolution by performing noise reduction based on images enlarged by the image enlarging portion 8.

Further, high quality still images can be obtained without reducing resolution by performing random noise reduction on images read in all-pixel reading mode.

As a result of the CCD image sensor 2 mixing pixel signals output from the plurality of photoelectric conversion elements in pixel mixing mode, images with greatly suppressed random noise are obtained in comparison to when operating in all-pixel reading mode in which pixel signals are not mixed, thereby allowing a greater random noise suppression effect to be obtained when noise reduction is performed on images read in all-pixel reading mode.

Note that although magnification in the image enlarging portion 8 is set to 1× or 3× in the present embodiment, the present invention is not limited to this magnification. The magnification can be determined according to the number of pixels decimated when pixel mixing is performed in the CCD image sensor 2.

Embodiment 2

Figure 3:
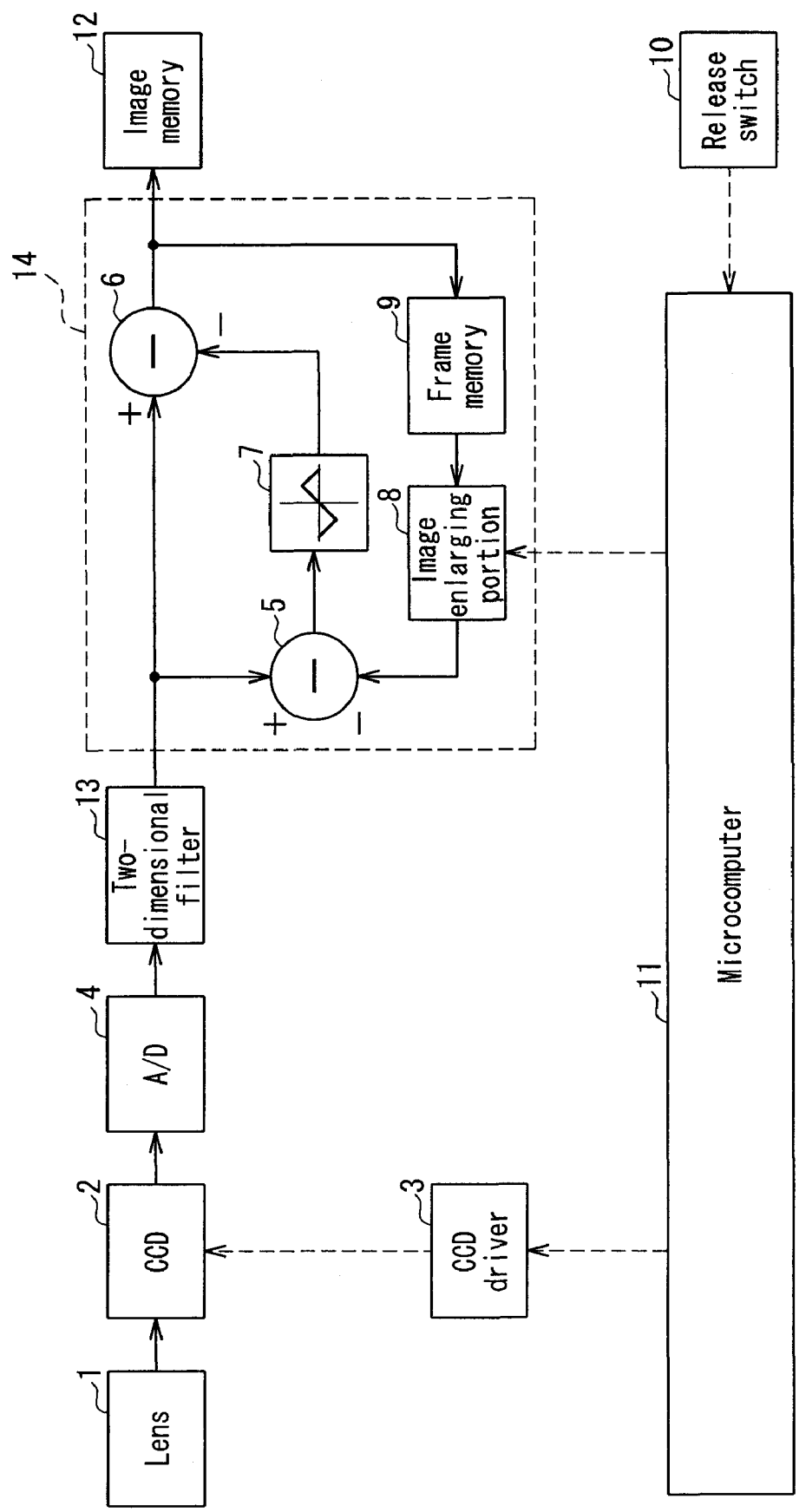
FIG. 3 is a block diagram of an image pickup apparatus according to embodiment 2.

FIG. 3 is a block diagram showing the configuration of an image pickup apparatus according to embodiment 2. Note that in FIG. 3 the same reference numerals are attached to constituent elements that are similar to the configuration shown in FIG. 1, and a detailed description of these elements will be omitted. The configuration shown in FIG. 3 results from adding a two-dimensional filter 13 to the configuration shown in FIG. 1. The image pickup apparatus of the present embodiment operates based on the timing chart shown in FIG. 2.

Figure 16:
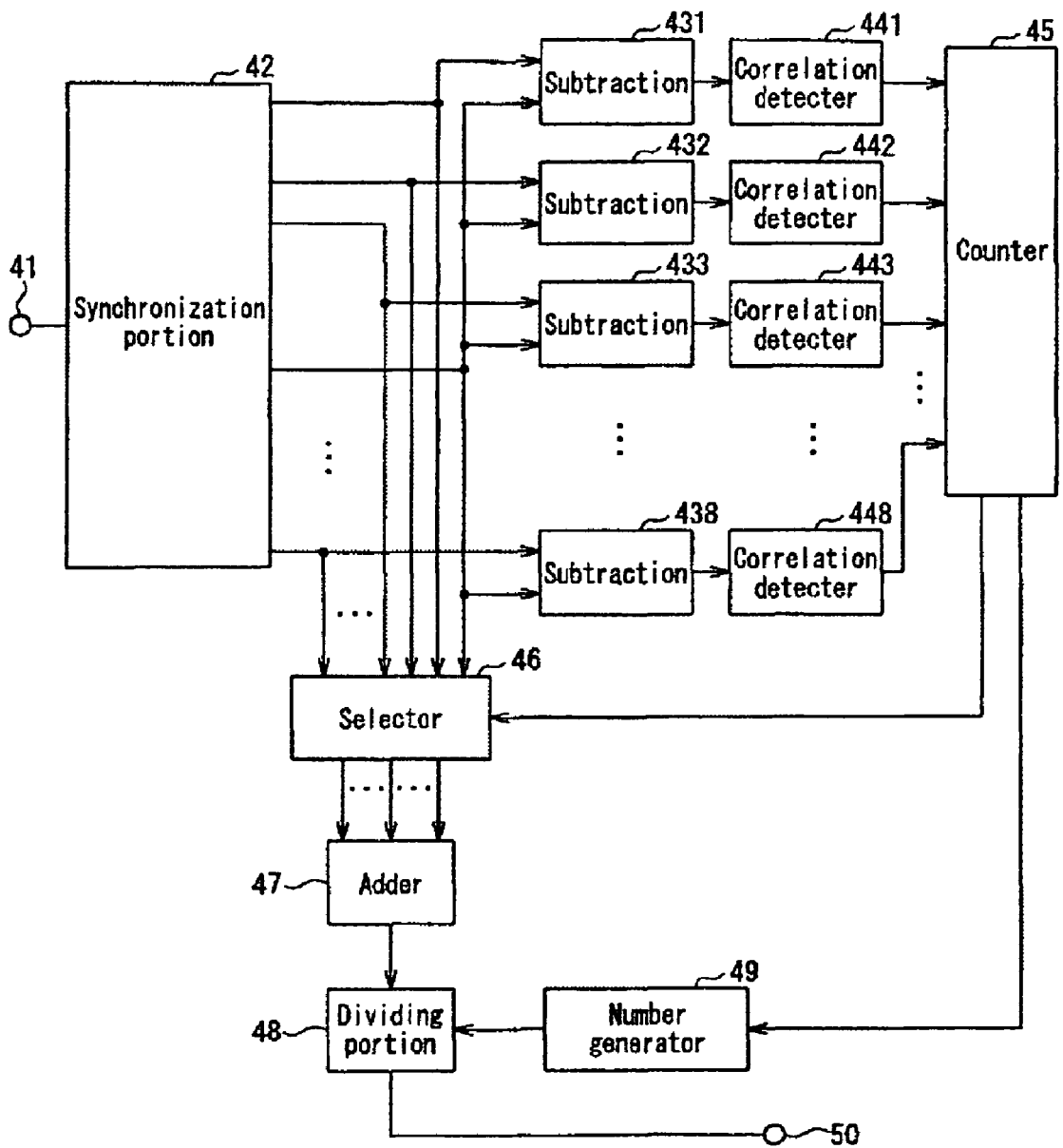
FIG. 16 is a block diagram of a two-dimensional filtering unit.
Figure 17:
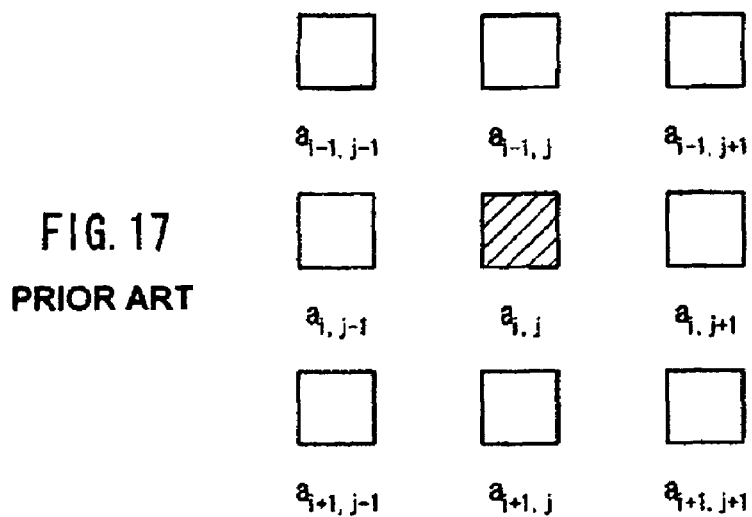
FIG. 17 is a schematic diagram showing the concept behind the synchronization in the two-dimensional filtering unit.

The two-dimensional filter 13 (filtering unit) has the configuration shown in FIG. 16 mentioned above, and adaptively performs low pass filtering based on the correlation between the target pixel and neighboring pixels (8 pixels).

The operations are described next.

In period 81 of FIG. 2, the image data that has undergone pixel mixing by the CCD image sensor 2 to decimate the pixels to one-third in the horizontal and vertical directions is input to the two-dimensional filter 13. The two-dimensional filter 13 adaptively performs low pass filtering on the image data, based on the correlation between the target pixel and neighboring pixels (8 pixels). For example, the two-dimensional filter 13 performs low pass filtering based on the correlation between a target pixel 61 and neighboring pixels 61a to 61h in FIG. 18. The image data output from the two-dimensional filter 13 is input to the first subtracter 5 and the second subtracter 6. Description of the subsequent operations, which are similar to the operations described in embodiment 1, is omitted.

According to the present embodiment, a greater random noise suppression effect is obtained in comparison to when two-dimensional filtering is not performed. Particularly where the CCD image sensor 2 operates in pixel mixing mode, the number of photoelectric conversion elements that undergo two-dimensional filtering is increased without increasing the number of taps in the two-dimensional filter 13, thereby enabling a significant random noise suppression effect to be obtained with little circuitry.

That is, attempting to increase the random noise suppression effect with only the two-dimensional filter 13 necessitates an increase in the number of filter taps, with the scale of the circuitry increasing in response to the increased number of taps. The image pickup apparatus of the present embodiment realizes a random noise suppression effect that references 81 pixels with little circuitry, by performing pixel mixing on nine pixels and two-dimensional filtering on nine pixels.

Embodiment 3

[1. Configuration of Image Pickup Apparatus]

Figure 4:
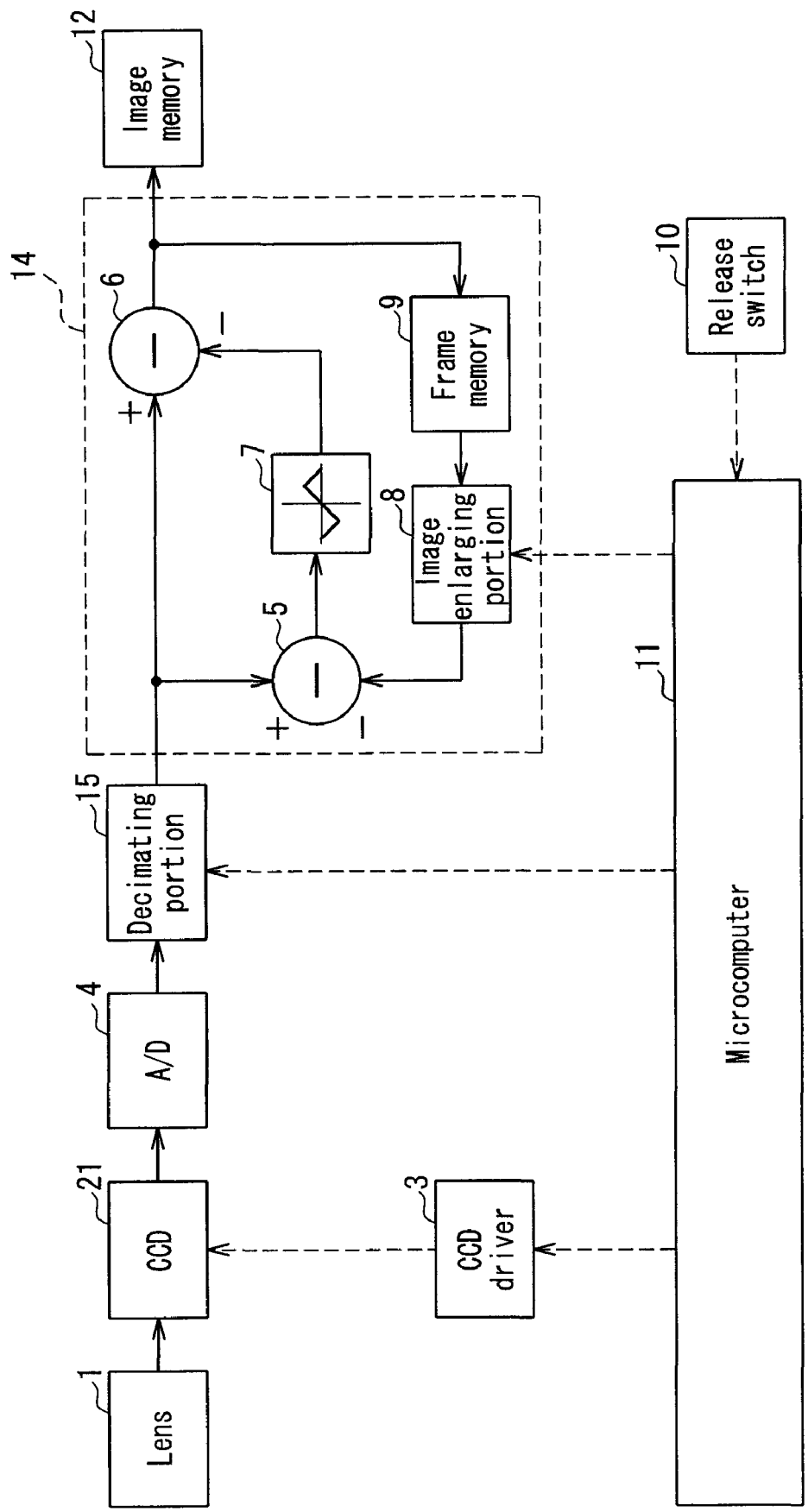
FIG. 4 is a block diagram of an image pickup apparatus according to embodiment 3.

FIG. 4 is a block diagram showing the configuration of an image pickup apparatus according to embodiment 3. Note that in FIG. 4 the same reference numerals are attached to constituent elements that are similar to the configuration shown in FIG. 1, and a detailed description of these elements will be omitted. The configuration shown in FIG. 4 results from adding a decimating portion 15 to the configuration shown in FIG. 1, and includes a CCD image sensor 21 in place of the CCD image sensor 2. The image pickup apparatus of the present embodiment operates based on the timing chart shown in FIG. 2. In the present embodiment, however, FIG. 2(b) shows the operations of the decimating portion 15.

The CCD image sensor 21, different from the CCD image sensor 2 of embodiment 1, is constituted by an image pickup element that operates only in all-pixel reading mode.

The decimating portion 15 operates in pixel mixing mode or all-pixel reading mode. Pixel mixing mode is a mode in which the image data output from the A/D conversion unit 4 is effectively decimated by adding pixels in the horizontal and vertical directions. The processing in this mode is the same as pixel mixing mode in the CCD image sensor 2 described in embodiment 1. All-pixel reading mode is a mode in which the image data input from the A/D conversion unit 4 is output without modification. Mode switching in the decimating portion 15 is controlled by the microcomputer 11.

[2. Image Capture Operations]

Firstly, while the release switch 10 is not operated, the microcomputer 11 controls the decimating portion 15 to operate in pixel mixing mode, as shown in period 81 of FIG. 2. The image signal (resulting from all-pixel reading) output from the CCD image sensor 21 is digitized by the A/D conversion unit 4, and image data is output.

The decimating portion 15 performs pixel mixing on the image data output from the A/D conversion unit 4. Specifically, the decimating portion 15 effectively decimates the image data output from the A/D conversion unit 4 by adding pixels in the horizontal and vertical directions. That is, low resolution image data is output from the decimating portion 15. The image data output from the decimating portion 15 is input to the first subtracter 5 and the second subtracter 6. Description of the subsequent operations, which are similar to embodiment 1, is omitted.

By causing the decimating portion 15 to operate in pixel mixing mode in period 81, the image size per frame is thus reduced, enabling high frame rate moving images to be obtained.

Next, when the release switch 10 is operated, the microcomputer 11 controls the CCD driver 3 to cause the CCD image sensor 21 to execute the exposure operation, as shown in period 82. After the end of period 82, the microcomputer 11 controls the CCD driver 3 to cause the CCD image sensor 21 to stop the exposure operation.

Next, once the exposure operation by the CCD image sensor 21 has ended, the microcomputer 11 controls the decimating portion 15 to operate in all-pixel reading mode, as shown in period 83. The decimating portion 15 thereby outputs the image data input from the CCD image sensor 21 via the A/D conversion unit 4 to the first subtracter 5 and the second subtracter 6 without modification. That is, high resolution image data is output from the decimating portion 15. Description of the subsequent operations, which are similar to the operations described in embodiment 1, is omitted.

[3. Effects of Embodiment and Related Matters]

According to the present embodiment, random noise can be suppressed, in addition to being able to obtain high frame rate image data (moving images), by including the decimating portion 15 and controlling the decimating portion 15 to decimate image data prior to exposure. Further, high resolution image data (still images) can be obtained by inhibiting the decimating portion 15 from decimating image data subsequent to exposure.

A reduction in costs also can be achieved for the apparatus as a whole, since the CCD image sensor 21, which operates only in one operation mode (all-pixel reading mode in the present embodiment), is low cost in comparison to a CCD image sensor that can selectively operate in a plurality of operation modes.

Figure 18:
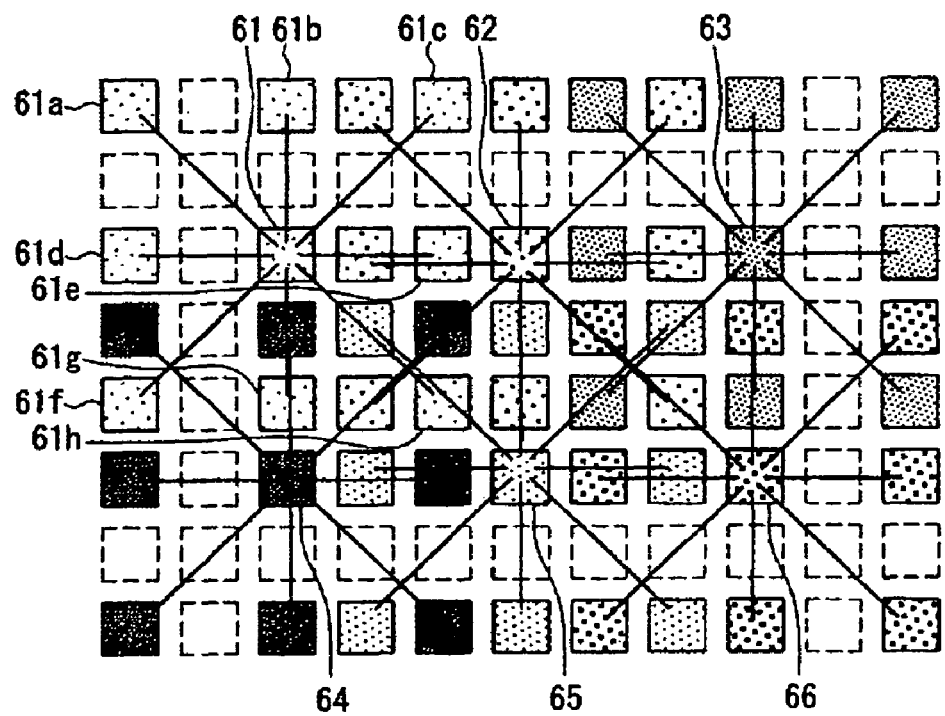
FIG. 18 is a schematic diagram showing the pixel combinations of an image pickup apparatus in pixel mixing mode.

Note that although a decimation rate of ⅓ in the horizontal and vertical directions is set in the present embodiment as the operation in pixel mixing mode based on the pixel combinations shown in FIG. 18 (neighboring pixels two removed from the target pixel in the vertical, lateral and diagonal directions), similar effects are obtained even with other combinations or decimation rates, by varying the magnification in the image enlarging portion 8 according to the decimation rate.

Embodiment 4

[1. Configuration of Image Pickup Apparatus]

Figure 5:
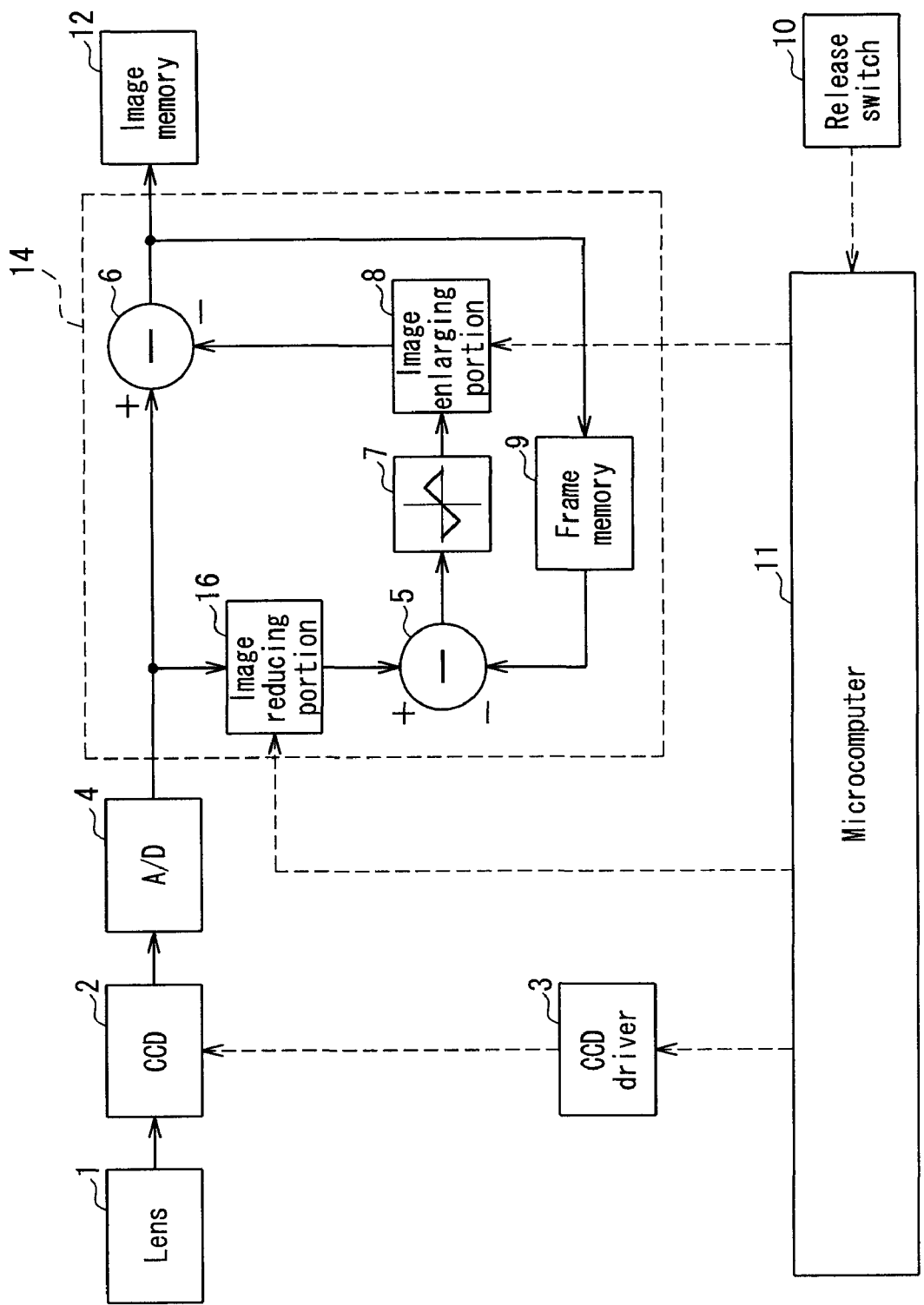
FIG. 5 is a block diagram of an image pickup apparatus according to embodiment 4.

FIG. 5 is a block diagram showing the configuration of an image pickup apparatus according to embodiment 4. Note that in FIG. 5 the same reference numerals are attached to constituent elements that are similar to the configuration shown in FIG. 1, and a detailed description of these elements will be omitted. The configuration shown in FIG. 5 results from adding an image reducing portion 16 to the configuration shown in FIG. 1.

The image reducing portion 16 is able to perform processing to reduce the image size of the image data output from the A/D conversion unit 4. The reduction method involves effectively decimating pixels by adding pixels in the horizontal and vertical directions of an image, for example. That is, the resolution of an image reduced by the image reducing portion 16 is lowered. The operations of the image reducing portion 16 are controlled by the microcomputer 11.

[2. Image Capture Operations]

Figure 6:
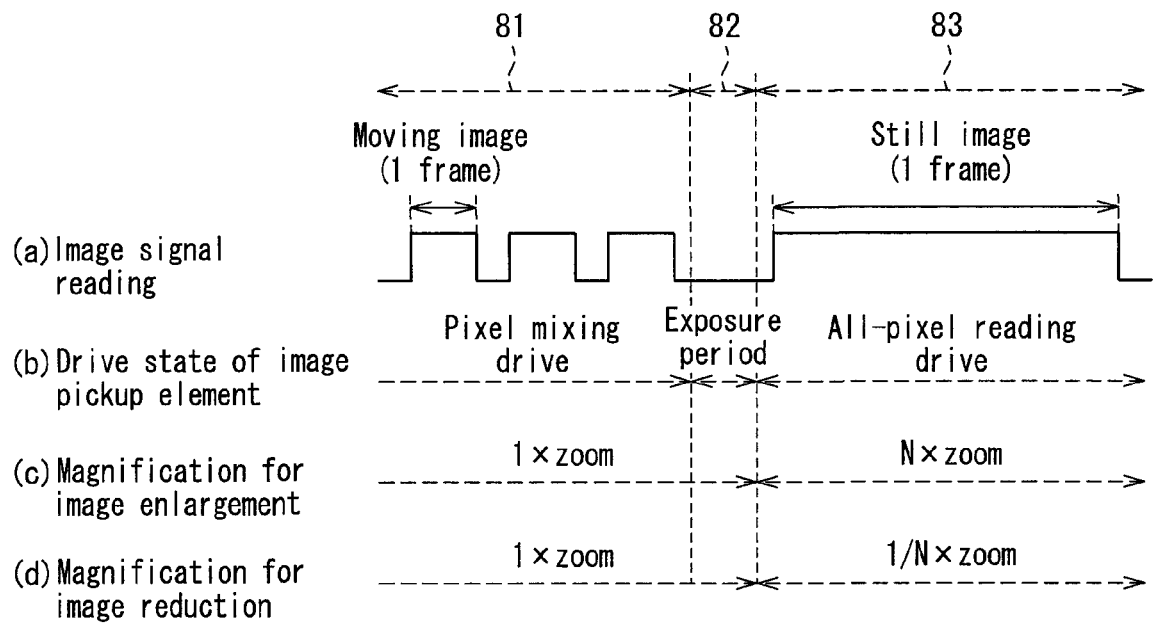
FIG. 6 is a timing chart of the image pickup apparatus according to embodiment 4.

FIG. 6 shows the state of various units when displaying moving images on the monitor (monitor state) and when capturing still images in the image pickup apparatus of the present embodiment. FIG. 6(a) shows the pixel signal reading state in the CCD image sensor 2, with pixel signals being read in the high period. FIG. 6(b) shows the drive state of the CCD image sensor 2. FIG. 6(c) shows the magnification in the image enlarging portion 8. FIG. 6(d) shows the magnification in the image reducing portion 16.

As shown in FIG. 6, the microcomputer 11, in period 81, controls the CCD driver 3 to drive the CCD image sensor 2 in pixel mixing mode. The microcomputer 11 also sets the magnification of both the image enlarging portion 8 and the image reducing portion 16 to 1×.

The CCD image sensor 2 effectively decimates the pixels by adding pixels in the horizontal and vertical directions. That is, a low resolution image signal is output from the CCD image sensor 2. One frame of image signal is output from the CCD image sensor 2 in a prescribed cycle and input to the A/D conversion unit 4.

The A/D conversion unit 4 digitizes the image signal output from the CCD image sensor 2, and outputs image data to the second subtracter 6 and the image reducing portion 16.

The second subtracter 6 suppresses random noise in the image data output from the A/D conversion unit 4, and writes the resultant image data to the image memory 12. Images based on the image data written to the image memory 12 are output sequentially to the monitor (not shown) by the display control unit (not shown), and moving images are displayed on the monitor.

On the other hand, the image reducing portion 16 outputs the input image data without converting the image size, since the magnification is set to 1×. Note that because the CCD image sensor 2 is operating in pixel mixing mode, the image size per frame is small, enabling high frame rate moving images to be obtained.

Here, the image data output from the A/D conversion unit 4 undergoes random noise suppression in the second subtracter 6, and the resultant image data is written to the frame memory 9. The image data read from the frame memory 9 after one frame has elapsed is input to the first subtracter 5.

The first subtracter 5 subtracts the image data (image size=1×) read from the frame memory 9 from the image data (image size=1×) output from the image reducing portion 16, and outputs the difference data.

The attenuation unit 7 attenuates the image data output from the first subtracter 5 by performing a nonlinear process thereon based on the characteristics shown in FIG. 20. The image data output from the attenuation unit 7 is input to the image enlarging portion 8.

The image enlarging portion 8 outputs the image data input from the attenuation unit 7 without changing the image size, since the magnification is set to 1×.

The second subtracter 6 subtracts the image data output from the image enlarging portion 8 from the image data output from the A/D conversion unit 4. Image data with suppressed random noise thereby is output from the second subtracter 6.

Next, when the release switch 10 is operated, the microcomputer 11 controls the CCD driver 3 to cause the CCD image sensor 2 to execute the exposure operation, as shown in period 82. After the end of period 82, the microcomputer 11 controls the CCD driver 3 to cause the CCD image sensor 2 to stop the exposure operation.

Next, the microcomputer 11 controls the CCD driver 3 to drive the CCD image sensor 2 in all-pixel reading mode, as shown in period 83. The microcomputer 11 also sets the magnification in the image enlarging portion 8 to N×, and the magnification in the image reducing portion 16 to 1/N×. Note that it is sufficient that N is greater than one. In the present embodiment N=3.

The image signal (image size=N×) output from the CCD image sensor 2 operating in all-pixel reading mode is digitized by the AMD conversion unit 4, and image data is output from the A/D conversion unit 4. The image data output from the A/D conversion unit 4 is input to the second subtracter 6 and the image reducing portion 16. The image reducing portion 16 reduces the size of the image data output from the A/D conversion unit 4 to 1/N×. That is, the size of the image data output from the image reducing portion 16 is 1×.

On the other hand, there is one frame of pre-exposure image data (image size=1×) stored in the frame memory 9. After the exposure shown in period 82 has ended, the image data read from the frame memory 9 is input to the first subtracter 5.

The first subtracter 5 subtracts the image data (image size=1×) read from the frame memory 9 from the image data (image size=1×) output from the image reducing portion 16, and outputs the difference data. The image data output from the first subtracter 5 is input to the attenuation unit 7.

The attenuation unit 7 attenuates the image data output from the first subtracter 5 by performing a nonlinear process thereon based on the characteristics shown in FIG. 20. The image data output from the attenuation unit 7 is input to the image enlarging portion 8.

The image enlarging portion 8 enlarges the image data (image size=1×) output from the attenuation unit 7 to N×, and outputs the enlarged image data.

The second subtracter 6 subtracts the image data (image size=N×) output from the image enlarging portion 8 from the image data (image size=N×) output from the A/D conversion unit 4. The image data output from the second subtracter 6 is written to the image memory 12. The display control unit (not shown) displays a still image on the monitor (not shown) based on the image data written to the image memory 12.

Once the random noise suppression has been completed, the image pickup apparatus returns again the state shown in period 81. That is, the state of moving images is displayed on the monitor.

[3. Side Effects of Random Noise Suppression]

When attempting to obtain difference data by comparing the image data read by the CCD image sensor in all-pixel reading mode with the enlarged image data, spurious signals may occur in edge portions of an image.

Figure 7A:
FIG. 7A is a waveform diagram showing the side effects of random noise suppression.
Figure 7A:
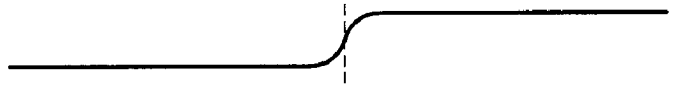
Figure 7A:
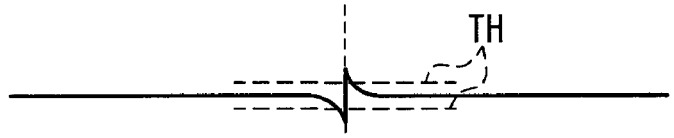
Figure 7A:
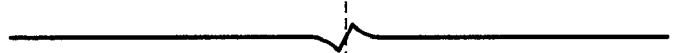
Figure 7A:
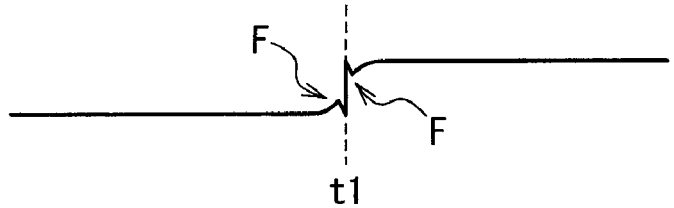
Figure 7B:
FIG. 7B is a waveform diagram for the units in the image pickup apparatus according to embodiments 4 and 5.
Figure 7B:
Figure 7B:
Figure 7B:
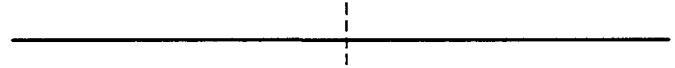
Figure 7B:

FIG. 7A is a timing chart showing the operations when difference data is obtained by comparing the image data read by the CCD image sensor in all-pixel reading mode with the enlarged image data. FIG. 7B is a timing chart showing the operations when difference data is obtained with the image pickup apparatus of the present embodiment. In FIGS. 7A and 7B, t1 is the edge portion of an image, and TH is the threshold of the attenuation unit 7. Note that the random noise component is disregarded in the following description.

When the first subtracter 5 subtracts the enlarged image data (FIG. 7A(b)) from the input image data (FIG. 7A(a)), the image data shown by FIG. 7A(c) is obtained. Next, the attenuation unit 7 attenuates the image data shown by FIG. 7A(c) based on the threshold TH, and outputs the image data shown by FIG. 7A(d). Next, the second subtracter 6 outputs the image data shown by FIG. 7A(e) as a result of subtracting the image data shown by FIG. 7A(d) from the image data shown by FIG. 7A(a). As described above, attempting to obtain difference data using an enlarged image results in a spurious signal F in proximity to the edge of the image, as shown by FIG. 7A(e). This is because two images with different resolutions are subtracted in the first subtracter 5.

That is, the image data shown by FIG. 7A(a), having not undergone the enlargement process, has a high resolution. On the other hand, the image data shown by FIG. 7A(b) has been enlarged by duplicating single pixels or performing linear interpolation from a plurality of pixels, so while the size of the image has been increased, the resolution remains the same as before the enlargement process (low resolution). Consequently, difference data with a large amplitude as shown by FIG. 7A(c) is output from the first subtracter 5, since the first subtracter 5 performs subtraction on a low resolution image and a high resolution image. As a result, the image data superimposed with the spurious signal F is output as shown by FIG. 7A(e).

In contrast, with the image pickup apparatus of the present embodiment, the first subtracter 5 subtracts images having the same resolution, since image enlargement is not performed upstream of the first subtracter 5. That is, the image data output from the image reducing portion 16 (FIG. 7B(a)) and the image data read from the frame memory 9 (FIG. 7B(b)) is input to the first subtracter 5 in FIG. 5. The first subtracter 5 performs subtraction with both pieces of the image data, and output the image data shown by FIG. 7B(c). Here, the value of the image data output from the first subtracter 5 approaches zero. Next, the image data shown by FIG. 7B(c) is input to the second subtracter 6 via the attenuation unit 7 and the image enlarging portion 8. The second subtracter 6 subtracts the image data shown by FIG. 7B(d) from the image data shown by FIG. 7B(a), and outputs the image data shown by FIG. 7B(e). As shown by FIG. 7B(e), a spurious signal F such as shown by FIG. 7A(e) is not superimposed on the image data output from the second subtracter 6.

In the present embodiment, the image reducing portion 16 reduces the image size of image data when the CCD image sensor 2 is operating in all-pixel reading mode. The image data input to the image reducing portion 16 effectively is decimated by adding pixels in the horizontal and vertical directions, thereby decreasing the resolution. The resolution of the image data at this time is equivalent to the resolution of the image data read from the frame memory 9. Thus, image data without a superimposed spurious signal can be obtained, as shown in FIG. 7B. By making the reduction method used by the image reducing portion 16 exactly the same as the image mixing method used by the CCD image sensor 2 when operating in pixel mixing mode, spurious signals caused by differences in resolution can be minimized.

Note that the configuration described in the present embodiment is an exemplary configuration that enables the side effects of random noise suppression to be resolved.

[4. Effects of Present Embodiment and Related Matters]

According to the present embodiment, the resolution of the image data output from the image reducing portion 16 can be equated with the resolution of the image data read from the frame memory 9, as a result of providing the image reducing portion 16 that reduces image size by decreasing the resolution of the image data output from the A/D conversion unit 4, when the CCD image sensor 2 is operating in all-pixel reading mode. Thus, the occurrence of spurious signals in the image data output from the second subtracter 6 is prevented, enabling the image quality to be improved.

Also, since the first subtracter 5 performs subtraction on pieces of the low resolution image data, the amount of calculation in the first subtracter 5 can be reduced, enabling high speed reading of image data. Thus, high frame rate moving images can be obtained in the monitor state prior to exposure.

Figure 8:
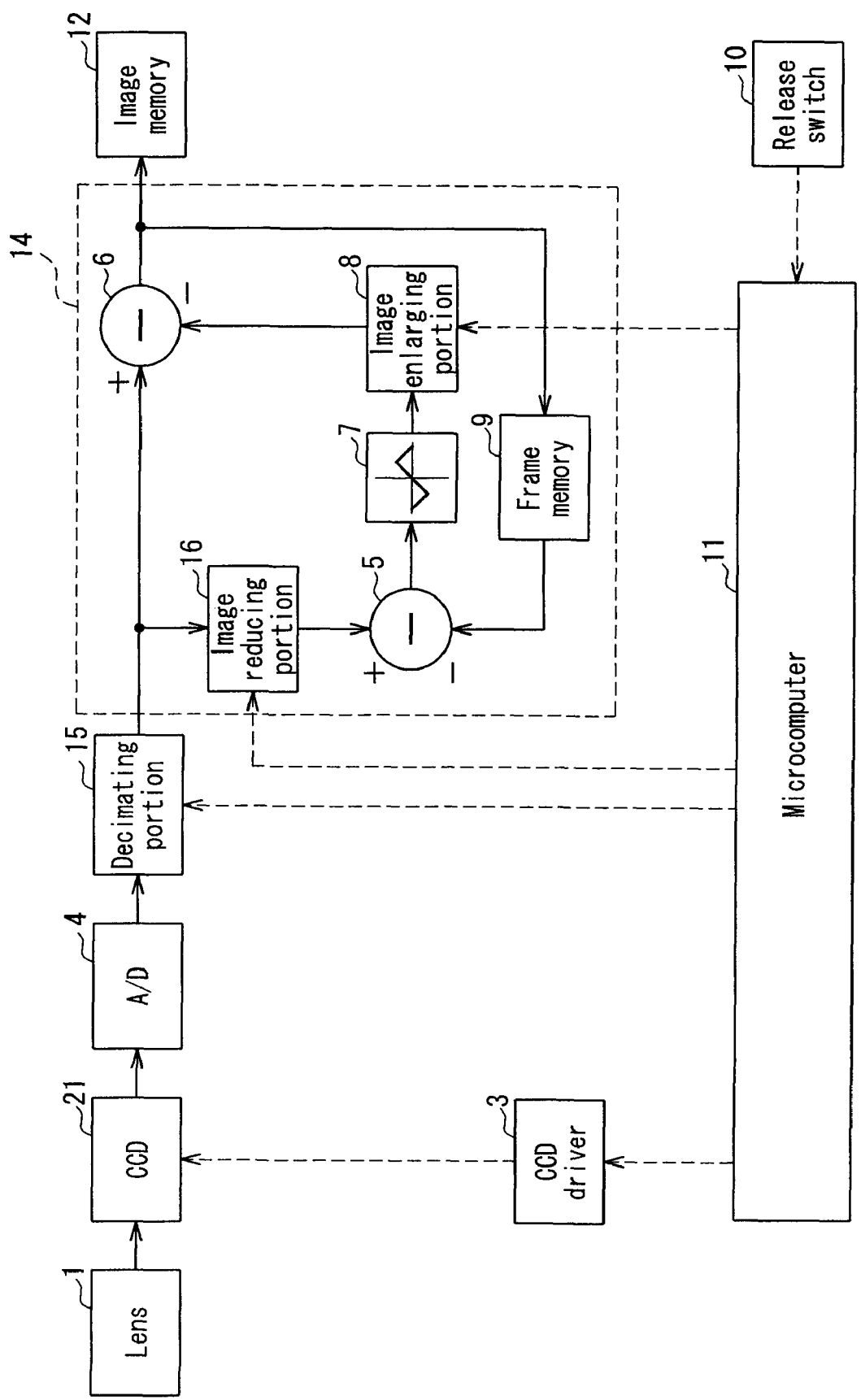
FIG. 8 is a block diagram of a further example of the image pickup apparatus according to embodiment 4.

Note that the CCD image sensor 2 may use an image pickup element that can only be driven in all-pixel reading mode. FIG. 8 shows a configuration in which the CCD image sensor 2 in FIG. 5 is replaced by the CCD image sensor 21, which only can be driven in all-pixel reading mode. This configuration further includes the decimating portion 15, which is operable in pixel mixing mode or all-pixel reading mode. The image pickup apparatus shown in FIG. 8 operates based on the timing chart shown in FIG. 6. FIG. 6(b), however, now shows the operations of the decimating portion 15. Pixel mixing mode is a mode in which low resolution image data is output by adding the horizontal and vertical pixels of the image data output from the A/D conversion unit 4. All-pixel reading mode is a mode in which the image data input from the A/D conversion unit 4 is output without modification. Mode switching in the decimating portion 15 is controlled by the microcomputer 11.

Firstly, while the release switch 10 is not operated, the microcomputer 11 controls the decimating portion 15 to operate in pixel mixing mode, as shown in period 81 of FIG. 6. The image signal (resulting from all-pixel reading) output from the CCD image sensor 21 is digitized by the A/D conversion unit 4, and image data is output.

The decimating portion 15 performs pixel mixing on the image data output from the A/D conversion unit 4. Specifically, the decimating portion 15 effectively decimates the image data output from the A/D conversion unit 4 by adding pixels in the horizontal and vertical directions. That is, low resolution image data is output from the decimating portion 15. The image data output from the decimating portion 15 is input to the image reducing portion 16 and the second subtracter 6. Description of the subsequent operations, which are similar to the operations of the image pickup apparatus shown in FIG. 5, is omitted.

By causing the decimating portion 15 to operate in pixel mixing mode in period 81, the image size per frame is thus reduced, enabling high frame rate moving images to be obtained.

Next, when the release switch 10 is operated, the microcomputer 11 controls the CCD driver 3 to cause the CCD image sensor 21 to execute the exposure operation, as shown in period 82. After the end of period 82, the microcomputer 11 controls the CCD driver 3 to cause the CCD image sensor 21 to stop the exposure operation.

Next, when the exposure operation by the CCD image sensor 21 has ended, the microcomputer 11 controls the decimating portion 15 to operate in all-pixel reading mode, as shown in period 83. The decimating portion 15 thereby outputs the image data input from the CCD image sensor 21 via the A/D conversion unit 4 to the image reducing portion 16 and the second subtracter 6 without modification. That is, high resolution image data is output from the decimating portion 15. Description of the subsequent operations, which are similar to the operations of the image pickup apparatus shown in FIG. 5, is omitted.

According to the image pickup apparatus shown in FIG. 8, a reduction in costs can be achieved for the apparatus as a whole, since the CCD image sensor 21, which operates only in one operation mode (all-pixel reading mode in the present embodiment), is low cost in comparison to a CCD image sensor that can operate selectively in a plurality of operation modes.

Embodiment 5

[1. Configuration of Image Pickup Apparatus]

Figure 9:
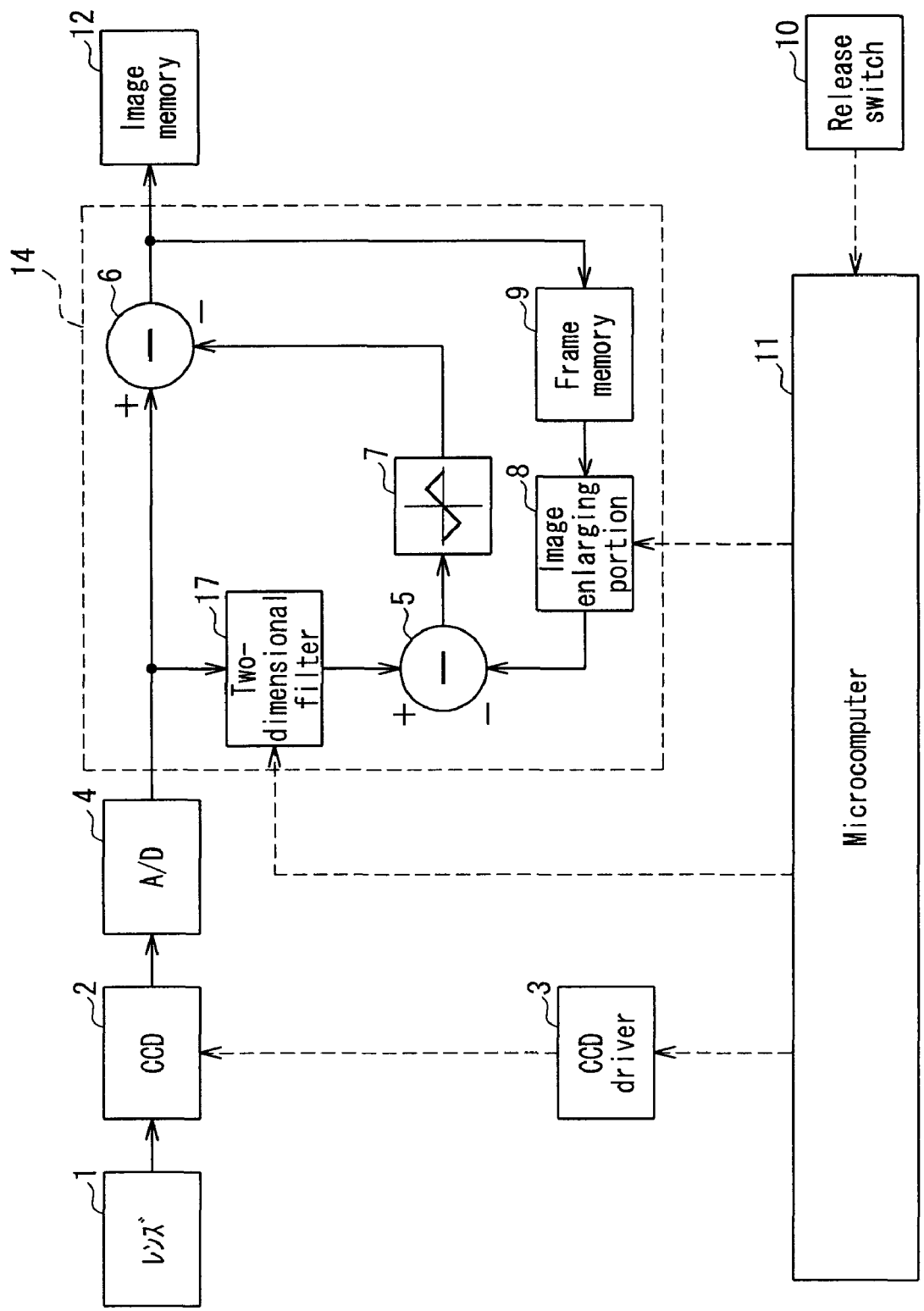
FIG. 9 is a block diagram of an image pickup apparatus according to embodiment 5.

FIG. 9 is a block diagram showing the configuration of an image pickup apparatus according to embodiment 5. Note that in FIG. 9 the same reference numerals are attached to constituent elements that are similar to the configuration shown in FIG. 1, and a detailed description of these elements will be omitted. The configuration shown in FIG. 9 results from adding a two-dimensional filter 17 to the configuration shown in FIG. 1.

The two-dimensional filter 17 (filtering unit) removes the high frequency component of the image data output from the A/D conversion unit 4. Thus, the edge portion of images based on the image data output from the two-dimensional filter 17 is blurred.

[2. Image Capture Operations]

Figure 10:
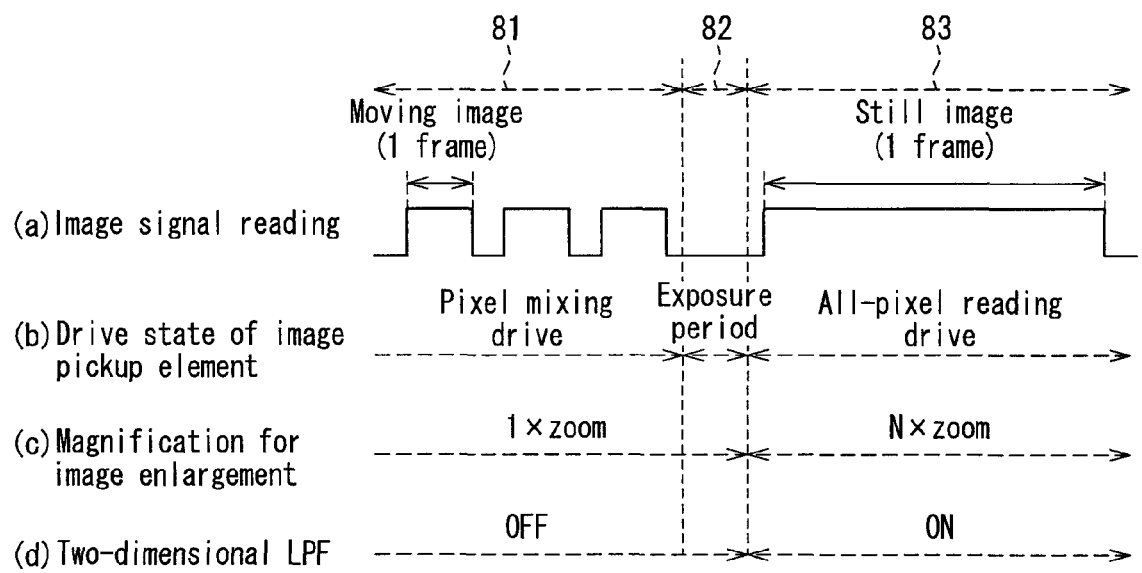
FIG. 10 is a timing chart image of the image pickup apparatus according to embodiment 5.

FIG. 10 shows the state of various units when displaying moving images on the monitor (monitor state) and when capturing still images in the image pickup apparatus of the present embodiment. FIG. 10(a) shows the pixel signal reading state in the CCD image sensor 2, with pixel signal being read in the high period. FIG. 10(b) shows the drive state of the CCD image sensor 2. FIG. 10(c) shows the magnification in the image enlarging portion 8. FIG. 10(d) shows the operational state of the two-dimensional filter 17.

As shown in FIG. 10, the microcomputer 11, in period 81, controls the CCD driver 3 to cause the CCD image sensor 2 to operate in pixel mixing mode, sets the magnification in the image enlarging portion 8 to 1×, and sets the two-dimensional filter 17 to OFF.

The CCD image sensor 2 effectively decimates the pixels by adding pixels in the horizontal and vertical directions. One frame worth of image signal is output from the CCD image sensor 2 in a prescribed cycle, and input to the A/D conversion unit 4.

The A/D conversion unit 4 digitizes the image signal output from the CCD image sensor 2, and outputs image data to the second subtracter 6 and the two-dimensional filter 17.

The second subtracter 6 suppresses random noise in the image data output from the A/D conversion unit 4, and writes the resultant image data to the image memory 12. Images based on the image data written to the image memory 12 are output to the monitor (not shown) by the display control unit (not shown), and moving images are displayed on the monitor.

On the other hand, the two-dimensional filter 17, being in an OFF state, outputs the input image data without modification. Note that since the CCD image sensor 2 is operating in pixel mixing mode, the image size per frame is small, enabling high frame rate moving images to be obtained.

Here, the image data output from the A/D conversion unit 4 undergoes random noise suppression in the second subtracter 6, and is written to the frame memory 9. The image data read from the frame memory 9 after one frame has elapsed is input to the image enlarging portion 8.

The image enlarging portion 8 outputs the image data read from the frame memory 9 to the first subtracter 5 without modification, since the magnification is set to 1×.

The first subtracter 5 subtracts the image data (image size=1×) output from the image enlarging portion 8 from the image data (image size=1×) output from the two-dimensional filter 17, and outputs the difference data. The image data output from the first subtracter 5 is input to the attenuation unit 7.

The attenuation unit 7 attenuates the image data output from the first subtracter 5 by performing a nonlinear process thereon based on the characteristics shown in FIG. 20. The image data output from the attenuation unit 7 is input to the second subtracter 6.

The second subtracter 6 subtracts the image data output from the attenuation unit 7 from the image data output from the A/D conversion unit 4. The second subtracter 6 thereby is able to output image data with suppressed random noise.

Next, when the release switch 10 is operated, the microcomputer 11 controls the CCD driver 3 to cause the CCD image sensor 2 to execute the exposure operation, as shown in period 82. After the end of period 82, the microcomputer 11 controls the CCD driver 3 to cause the CCD image sensor 2 to stop the exposure operation.

Next, the microcomputer 11 controls the CCD driver 3 to drive the CCD image sensor 2 in all-pixel reading mode, as shown in period 83. The microcomputer 11 also sets the magnification in the image enlarging portion 8 to N× (N=3 in the present embodiment), and sets the two-dimensional filter 17 to ON.

The image signal (image size=N×) output from the CCD image sensor 2 operating in all-pixel reading mode is digitized by the A/D conversion unit 4, and image data is output. The image data output from the A/D conversion unit 4 is input to the second subtracter 6 and the two-dimensional filter 17.

The two-dimensional filter 17 removes the high frequency component of the image data output from the A/D conversion unit 4. The image data output from the two-dimensional filter 17 thereby will result in an image in which the edge portions are blurred.

On the other hand, there is one frame of pre-exposure image data (image size=1×) stored in the frame memory 9. After the exposure shown in period 82 has ended, the image data read from the frame memory 9 is input to the image enlarging portion 8.

The image enlarging portion 8 enlarges the image data read from the frame memory 9 by duplicating single pixels or performing linear interpolation from a plurality of pixels. Since the image data output from the image enlarging portion 8 has been enlarged by signal processing, there is little high frequency component, resulting in an image with blurred edge portions. The image data output from the image enlarging portion 8 is input to the first subtracter 5.

The first subtracter 5 subtracts the image data (image size=N×) output from the image enlarging portion 8 from the image data (image size=N×) output from the two-dimensional filter 17, and outputs the difference data. That is, the first subtracter 5 performs subtraction on pieces of image data from which the high frequency component has been removed. The image data output from the first subtracter 5 is input to the attenuation unit 7.

The attenuation unit 7 attenuates the image data output from the first subtracter 5 by performing a nonlinear process thereon based on the characteristics shown in FIG. 20. The image data output from the attenuation unit 7 is input to the second subtracter 6.

The second subtracter 6 subtracts the image data output from the attenuation unit 7 from the image data output from the A/D conversion unit 4. The image data output from the second subtracter 6 is written to the image memory 12. The display control unit (not shown) displays a still image on the monitor (not shown) based on the image data written to the image memory 12.

Once the random noise suppression has been completed, the image pickup apparatus returns again to the state shown in period 81. That is, the state of moving images is displayed on the monitor.

[3. Effects of Embodiment and Related Matters]

According to the present embodiment, the first subtracter 5 generates difference data by performing subtraction on the image data from which the high frequency component has been removed by two-dimensional filtering and the image data with reduced high frequency component output from the image enlarging portion 8, as a result of providing the two-dimensional filter 17, which removes the high frequency component of the image data input to the first subtracter 5. Thus, the occurrence of spurious signals such as described in embodiment 4 can be prevented, enabling image quality to be improved.

That is, when subtraction is performed on the image data from which the high frequency component has been removed and the image data from which the high frequency component has not been removed, the difference increases, as shown by FIG. 7A(c). The result is a spurious signal F such as shown in FIG. 7A(e). With the present embodiment, in contrast, subtraction is performed on pieces of the image data from which the high frequency component has been removed as shown in FIG. 7A(b), so the difference is reduced. Thus, image data can be obtained in which spurious signals do not occur, as shown in FIG. 7B(e).

Figure 11:
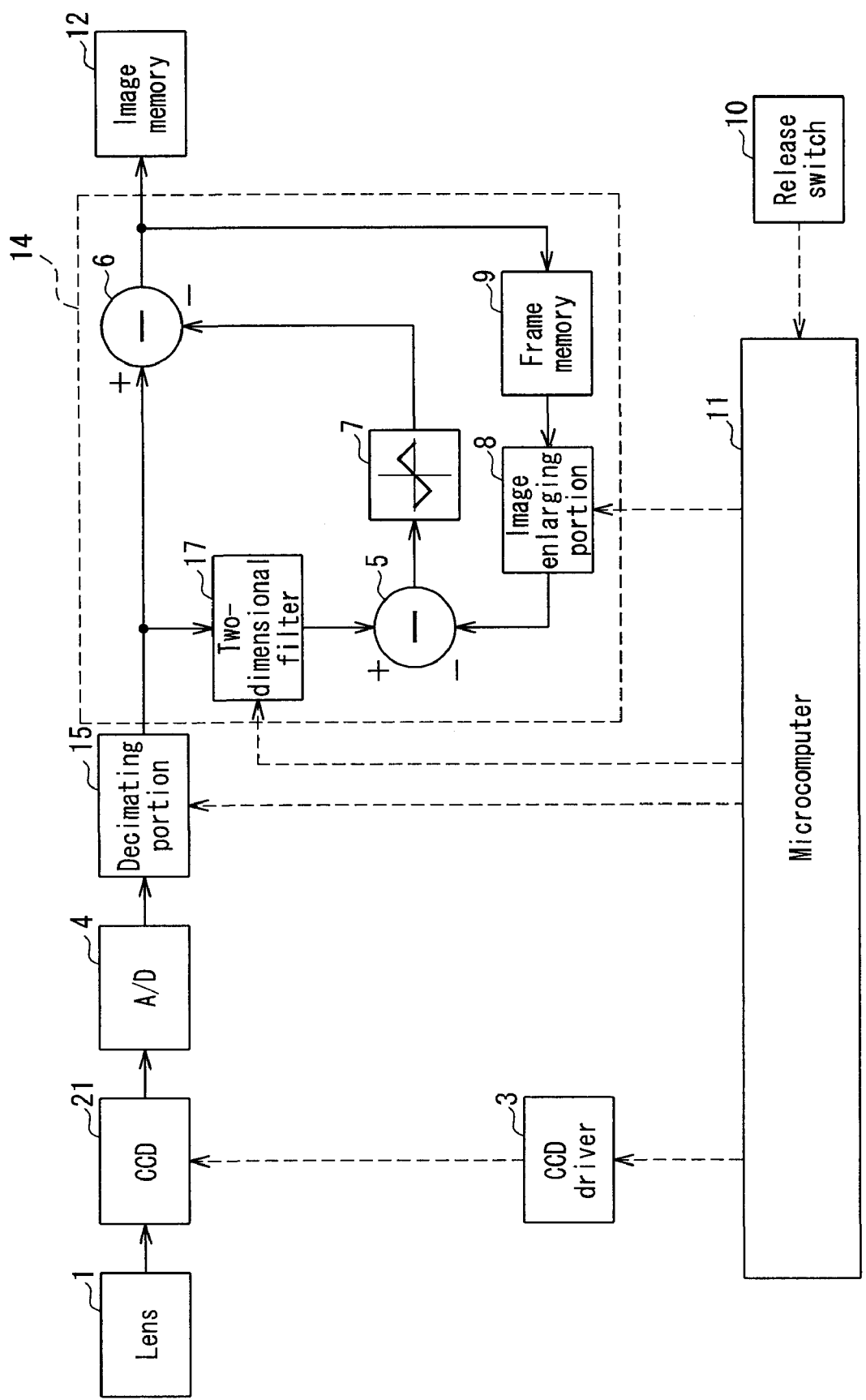
FIG. 11 is a block diagram of a further example of the image pickup apparatus according to embodiment 5.

Note that the CCD image sensor 2 may use an image pickup element that only can be driven in all-pixel reading mode. FIG. 11 shows a configuration in which the CCD image sensor 2 in FIG. 9 is replaced by the CCD image sensor 21, which only can be driven in all-pixel reading mode. This configuration further includes the decimating portion 15, which is operable in pixel mixing mode or all-pixel reading mode. The image pickup apparatus shown in FIG. 11 operates based on the timing chart shown in FIG. 10. FIG. 10(b), however, now shows the operations of the decimating portion 15. Pixel mixing mode is a mode in which low resolution image data is output by adding the horizontal and vertical pixels of the image data output from the A/D conversion unit 4. All-pixel reading mode is a mode in which image data input from the A/D conversion unit 4 is output without modification. Mode switching in the decimating portion 15 is controlled by the microcomputer 11.

Firstly, while the release switch 10 is not operated, the microcomputer 11 controls the decimating portion 15 to operate in pixel mixing mode, as shown in period 81 of FIG. 10. The image signal (resulting from all-pixel reading) output from the CCD image sensor 21 is digitized by the A/D conversion unit 4, and image data is output.

The decimating portion 15 performs pixel mixing on the image data output from the A/D conversion unit 4. Specifically, the decimating portion 15 effectively decimates the image data output from the A/D conversion unit 4 by adding pixels in the horizontal and vertical directions. That is, low resolution image data is output from the decimating portion 15. The image data output from the decimating portion 15 is input to the two-dimensional filter 17 and the second subtracter 6. Description of the subsequent operations, which are similar to operations of the image pickup apparatus shown in FIG. 9, is omitted.

By causing the decimating portion 15 to operate in pixel mixing mode in period 81, the image size per frame is thus reduced, enabling high frame rate moving images to be obtained.

Next, when the release switch 10 is operated, the microcomputer 11 controls the CCD driver 3 to cause the CCD image sensor 21 to execute the exposure operation, as shown in period 82. After the end of period 82, the microcomputer 11 controls the CCD driver 3 to cause the CCD image sensor 21 to stop the exposure operation.

Next, when the exposure operation by the CCD image sensor 21 has ended, the microcomputer 11 controls the decimating portion 15 to operate in all-pixel reading mode, as shown in period 83. The decimating portion 15 thereby outputs the image data input from the CCD image sensor 21 via the A/D conversion unit 4 to the two-dimensional filter 17 and the second subtracter 6 without modification. That is, high resolution image data is output from the decimating portion 15. Description of the subsequent operations, which are similar to the operations of the image pickup apparatus shown in FIG. 9, is omitted.

According to the image pickup apparatus shown in FIG. 11, a reduction in costs can be achieved for the apparatus as a whole, since the CCD image sensor 21, which operates only in one operation mode (all-pixel reading mode in the present embodiment), is low cost in comparison to a CCD image sensor that can operate selectively in a plurality of operation modes.

Embodiment 6

[1. Configuration of Image Pickup Apparatus]

Figure 12:
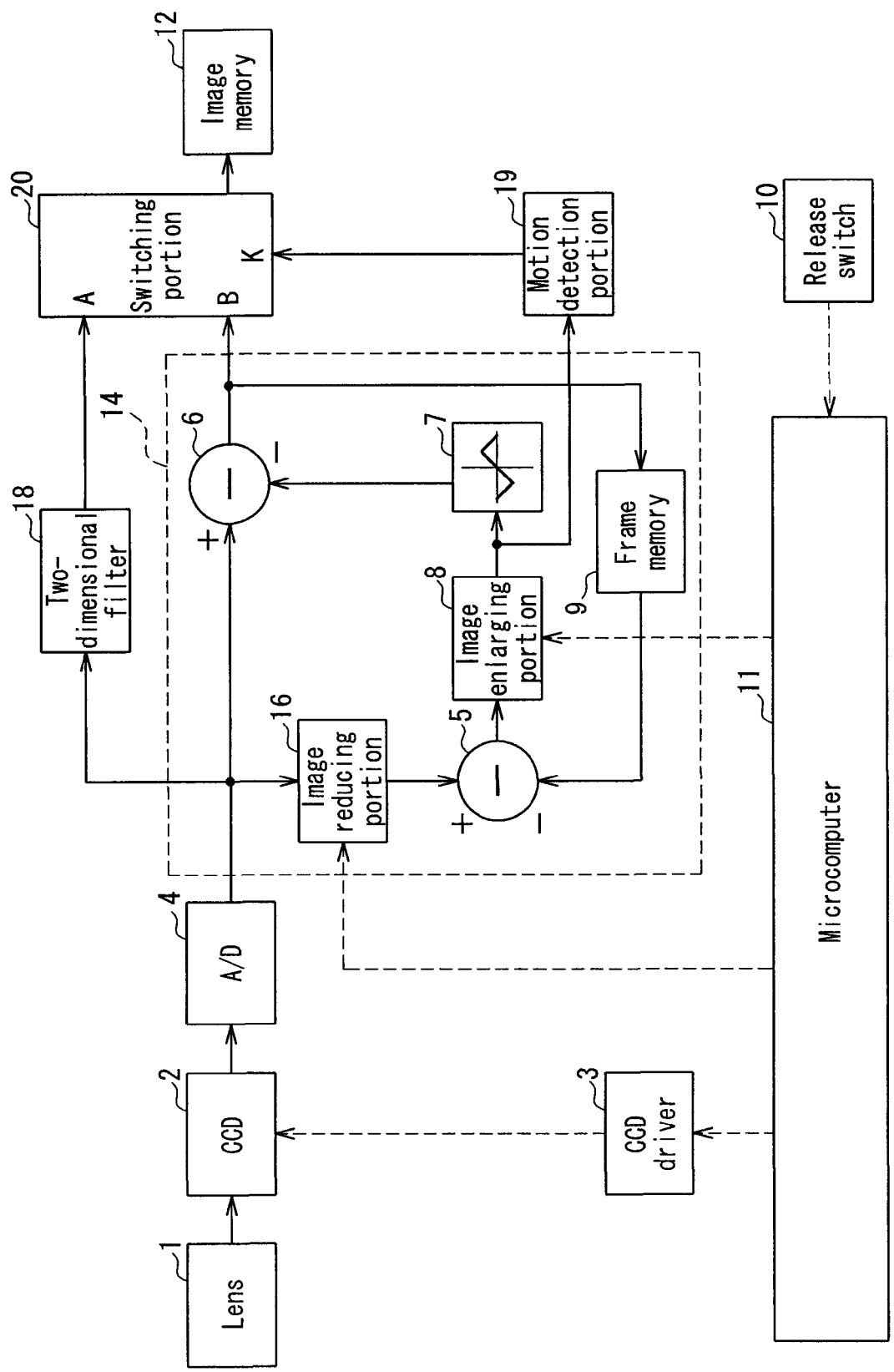
FIG. 12 is a block diagram of an image pickup apparatus according to embodiment 6.

FIG. 12 is a block diagram showing the configuration of an image pickup apparatus according to embodiment 6. Note that in FIG. 12 the same reference numerals are attached to constituent elements that are similar to the configuration shown in FIG. 5, and a detailed description of these elements will be omitted. The configuration shown in FIG. 12 results from adding a two-dimensional filter 18, a motion detection portion 19 and a switching unit 20 to the configuration shown in FIG. 5.

The two-dimensional filter 18 (filtering unit) has the configuration shown in FIG. 16 mentioned above, and adaptively performs low pass filtering based on the correlation between the target pixel and neighboring pixels (eight pixels).

Figure 13:
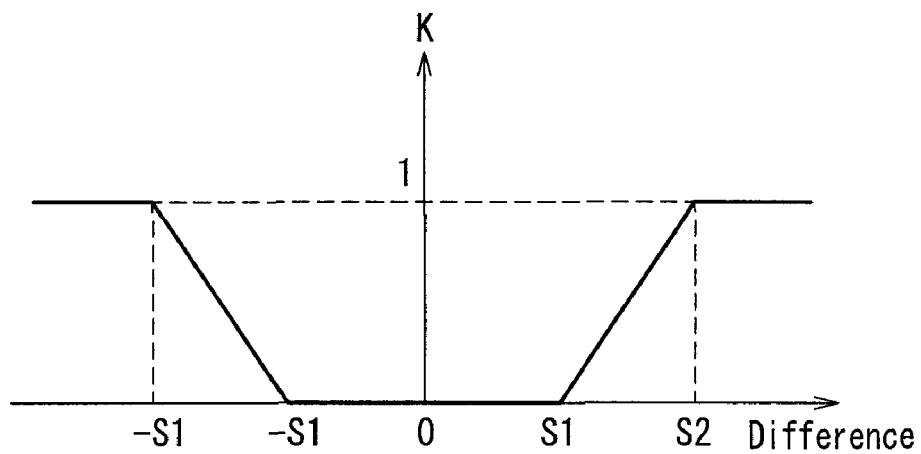
FIG. 13 is a characteristic diagram showing the relation between a difference and a coefficient in a motion detection portion according to embodiment 6.

The motion detection portion 19 detects motion in an image based on the image data output from the image enlarging portion 8. Specifically, the motion detection portion 19 outputs coefficient K according to the absolute value of the image data (difference) output from the image enlarging portion 8. FIG. 13 shows the relation between the difference and coefficient K. As shown in FIG. 13, if the absolute value of the difference is S1 or less, there is judged to be no motion in the image, and coefficient K=0 is output. If the absolute value of the difference is S2 or greater, coefficient K=1 is output. If the absolute value of the difference is in the range from S1 to S2, coefficient K varies from 0 to 1 according to the difference.

Figure 14:
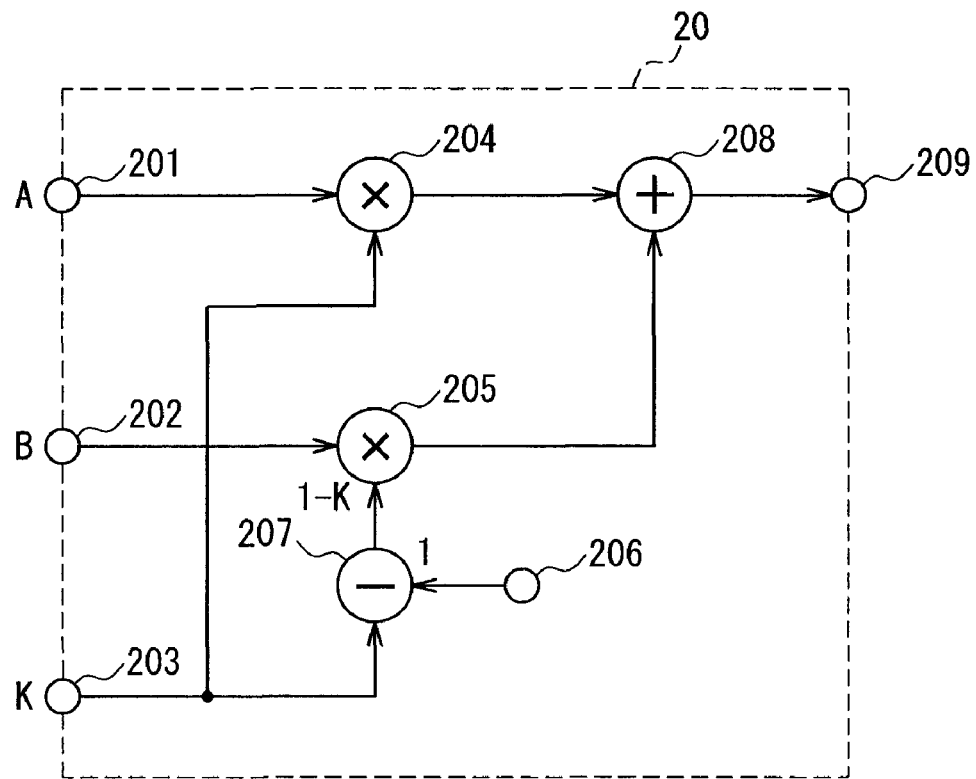
FIG. 14 is a logic circuit diagram of a switching unit according to embodiment 6.

The two-dimensional filter 18 is connected to an A terminal of the switching unit 20, while the second subtracter 6 is connected to a B terminal. Image data filtered (two-dimensional noise reduction) by the two-dimensional filter 18 is input to the A terminal. Image data that has undergone random noise suppression (three-dimensional noise reduction) by the noise reduction circuit 14 is input to the B terminal. The switching unit 20 adds the image data output from the two-dimensional filter 18 and the image data output from the second subtracter 6 at a prescribed ratio, depending on coefficient K output from the motion detection portion 19, and outputs the result. In the present embodiment, the image data input to the A terminal is output to the image memory 12 if coefficient K=1 is output from the motion detection portion 19. If coefficient K=0, the image data input to the B terminal is output to the image memory 12. If 0<K<1, the image data input to the A terminal and the image data input to the B terminal are added at a prescribed ratio, and the result is output to the image memory 12. FIG. 14 shows a detailed configuration of the switching unit 20, the operations of which will be discussed in detail later.

[2. Image Capture Operations]

As shown in FIG. 12, the microcomputer 11, prior to exposure, controls the CCD driver 3 to drive the CCD image sensor 2 in pixel mixing mode. The microcomputer 11 also sets the magnification of both the image enlarging portion 8 and the image reducing portion 16 to 1×.

The CCD image sensor 2 effectively decimates the pixels by adding pixels in the horizontal and vertical directions. One frame of image signal is output from the CCD image sensor 2 in a prescribed cycle and input to the A/D conversion unit 4. The A/D conversion unit 4 digitizes the image signal output from the CCD image sensor 2, and outputs image data. The image data output from the A/D conversion unit 4 is input to the second subtracter 6, the image reducing portion 16 and the two-dimensional filter 18.

The second subtracter 6 suppresses random noise in the image data output from the A/D conversion unit 4, and writes the resultant image data to the frame memory 9. The image data read from the frame memory 9 after one frame has elapsed is input to the first subtracter 5.

The image reducing portion 16 outputs the image data input from the A/D conversion unit 4 without changing the image size, since the magnification is set to 1×. The image data output from the image reducing portion 16 is input to the first subtracter 5.

The first subtracter 5 subtracts the image data (image size=1×) read from the frame memory 9 from the image data (image size=1×) output from the image reducing portion 16, and outputs the difference data. The image data output from the first subtracter 5 is input to the image enlarging portion 8.

The image enlarging portion 8 outputs the image data input from the first subtracter 5 without changing the image size, since the magnification is set to 1×. The image data output from the image enlarging portion 8 is input to the attenuation unit 7 and the motion detection portion 19.

The attenuation unit 7 attenuates the image data output from the image enlarging portion 8 by performing a nonlinear process thereon based on the characteristics shown in FIG. 20. The image data output from the attenuation unit 7 is input to the second subtracter 6.

The second subtracter 6 subtracts the image data output from the attenuation unit 7 from the image data output from the A/D conversion unit 4. The second subtracter 6 thereby is able to output image data with suppressed random noise.

The motion detection portion 19 outputs coefficient K based on the image data output from the image enlarging portion 8. Specifically, the motion detection portion 19 determines coefficient K according to the value of the image data (difference), based on the characteristics shown in FIG. 13. With the image pickup apparatus in the pre-exposure state (monitor state), there is significant motion in the images, so coefficient K is continually output at substantially K=1. The output coefficient K is input to the switching unit 20.

The switching unit 20 adds the image data input to the A terminal and the image data input to the B terminal at a prescribed ratio, based on coefficient K output from the motion detection portion 19. With the image pickup apparatus in the pre-exposure state, coefficient K=1 is continually output, so the switching unit 20 outputs the image data input to the A terminal. The image data output from the A/D conversion unit 4 is thereby filtered by the two-dimensional filter 18, and written to the image memory 12 via the switching unit 20. The display control unit (not shown) displays moving images on the monitor (not shown) based on the image data written to the image memory 12.

Next, when the release switch 10 is operated, the microcomputer 11 controls the CCD driver 3 to cause the CCD image sensor 2 to execute the exposure operation. After a prescribed time period has elapsed, the microcomputer 11 controls the CCD driver 3 to cause the CCD image sensor 2 to stop the exposure operation.

Next, the microcomputer 11 controls the CCD driver 3 to drive the CCD image sensor 2 in all-pixel reading mode. The microcomputer 11 also sets the magnification in the image enlarging portion 8 to N×, and the magnification in the image reducing portion 16 to 1/N×. In the present embodiment N=3.

The image signal (image size=N×) output from the CCD image sensor 2 operating in all-pixel reading mode is digitized by the A/D conversion unit 4, and the image data is output. The image data output from the A/D conversion unit 4 is input to the second subtracter 6, the image reducing portion 16 and the two-dimensional filter 18. The image reducing portion 16 reduces the image size of the image data output from the A/D conversion unit 4 to 1/N×. That is, the size of the image data output from the image reducing portion 16 is 1×. The image data output from the image reducing portion 16 is input to the first subtracter 5.

On the other hand, there is one frame of pre-exposure image data (image size=1×) stored in the frame memory 9. After the exposure has ended, the image data read from the frame memory 9 is input to the first subtracter 5.

The first subtracter 5 subtracts the image data (image size=1×) read from the frame memory 9 from the image data (image size=1×) output from the image reducing portion 16, and outputs the difference data. The image data output from the first subtracter 5 is output to the image enlarging portion 8.

The image enlarging portion 8 enlarges the image data output from the first subtracter 5 to N×, and outputs the result. The image data output from the image enlarging portion 8 is input to the attenuation unit 7 and the motion detection portion 19.

The attenuation unit 7 attenuates the image data output from the image enlarging portion 8 by performing a nonlinear process thereon based on the characteristics shown in FIG. 20. The image data output from the attenuation unit 7 is input to the second subtracter 6.

The second subtracter 6 subtracts the image data output from the attenuation unit 7 from the image data output from the A/D conversion unit 4. The image data output from the second subtracter 6 is input to the switching unit 20.

The motion detection portion 19 determines and outputs coefficient K based on the image data (difference) output from the image enlarging portion 8. Coefficient K is determined based on the characteristics shown in FIG. 13. That is, if there is significant motion in the image, coefficient K will take a large value (maximum value K=1) because of the large difference of the image data. On the other hand, if there is little motion in the image, coefficient K will take a small value (minimum value K=0) because of the small difference of the image data. Coefficient K output from the motion detection portion 19 is input to the switching unit 20.

The switching unit 20 adds the image data input to the A terminal and the image data input to the B terminal at a prescribed ratio, based on coefficient K output from the motion detection portion 19, and writes the added image data to the image memory 12. The display control unit (not shown) displays a still image on the monitor (not shown) based on the image data written to the image memory 12.

Once the random noise suppression has been completed, the image pickup apparatus returns again to the pre-exposure state. That is, the state of moving images being displayed on the monitor.

FIG. 14 shows a detailed configuration of the switching unit 20. The switching unit 20 includes an A terminal 201, a B terminal 202, a K terminal 203, a first multiplier 204, a second multiplier 205, a reference input terminal 206, a third subtracter 207, an adder 208, and an output terminal 209. In FIG. 14, the A terminal 201 is connected to the two-dimensional filter 18. The image data input to the A terminal 201 is input to the first multiplier 204. The B terminal 202 is connected to the second subtracter 6. The image data input to the B terminal 202 is input to the second multiplier 205. Coefficient K input to the K terminal 203 is input to the first multiplier 204 and the third subtracter 207. The third subtracter 207 subtracts coefficient K from the reference value (=1 in the present embodiment) input to the reference input terminal 206 (1−K). The value output from the third subtracter 207 is input to the second multiplier 205. The image data output from the first multiplier 204 and the image data output from the second multiplier 205 is input to the adder 208. The image data output from the adder 208 is output externally via the output terminal 209.

For example, if coefficient K=0 is input to the K terminal 203, with the image data output from the two-dimensional filter 18 being input to the A terminal 201 and the image data output from the noise reduction circuit 14 being input to the B terminal 202, the output of the first multiplier 204 will be 0. The value 1 is output from the third subtracter 207, and input to the second multiplier 205. Thus, only the image data output from the second multiplier 205 is input to the adder 208, and the image data input to the B terminal 202 is output from the output terminal 209.

If coefficient K=1 is input to the K terminal 203, the image data output from the first multiplier 204 is input to the adder 208. The value 0 is output from the third subtracter 207, and input to the second multiplier 205. The output of the second multiplier 205 will thereby be 0. Thus, only the image data output from the first multiplier 204 is input to the adder 208, and the image data input to the A terminal 201 is output from the output terminal 209.

If coefficient K input to the K terminal 203 is a prescribed value between 0 and 1, the ratio of the image data output from the first multiplier 204 and the image data output from the second multiplier 205 changes according to the value of K. For example, if coefficient K=0.8 is input, 80% of the image data output from the first multiplier 204 and 20% of the image data output from the second multiplier 205 will be input to the adder 208.

[3. Effects of Embodiment and Related Matters]

According to the present embodiment, degradation of the S/N ratio when there is significant motion in an image can be prevented by adopting a configuration in which motion in an image is detected by the motion detection portion 19, with filtering being performed by the two-dimensional filter 18 when there is significant motion, and random noise suppression being performed by the noise reduction circuit 14 when there is little motion. That is, performing processing with the noise reduction circuit 14 when there is significant motion takes more correction than necessary because of the low inter-frame correlation, or the portion of the significant motion is not corrected at all, it could affect image quality adversely. In the present embodiment, deterioration in image quality can be suppressed because filtering with the two-dimensional filter is prioritized when there is significant motion in an image.

Note that although image motion detection by the motion detection portion 19 and switching by the switching unit 20 are performed in both the pre-exposure and post-exposure states in the present embodiment, it is sufficient if the motion detection portion 19 and the switching unit 20 operate in at least the post-exposure state.

Also, although coefficient K output from the motion detection portion 19 changes linearly from 0 to 1 in the present embodiment, as shown in FIG. 13, the two values 0 and 1 may be used. The switching unit 20 is thereby only able to select and output either the image data output from the two-dimensional filter 18 or the image data output from the noise reduction circuit 14.

Further, although motion detection in the present embodiment uses difference data output from the first subtracter 5, the present invention is not limited to this.

Further, although embodiment 6 is combined with the configuration described in embodiment 5, embodiment 6 also can be combined with any of the configurations described in embodiments 1 to 4.

Figure 15:
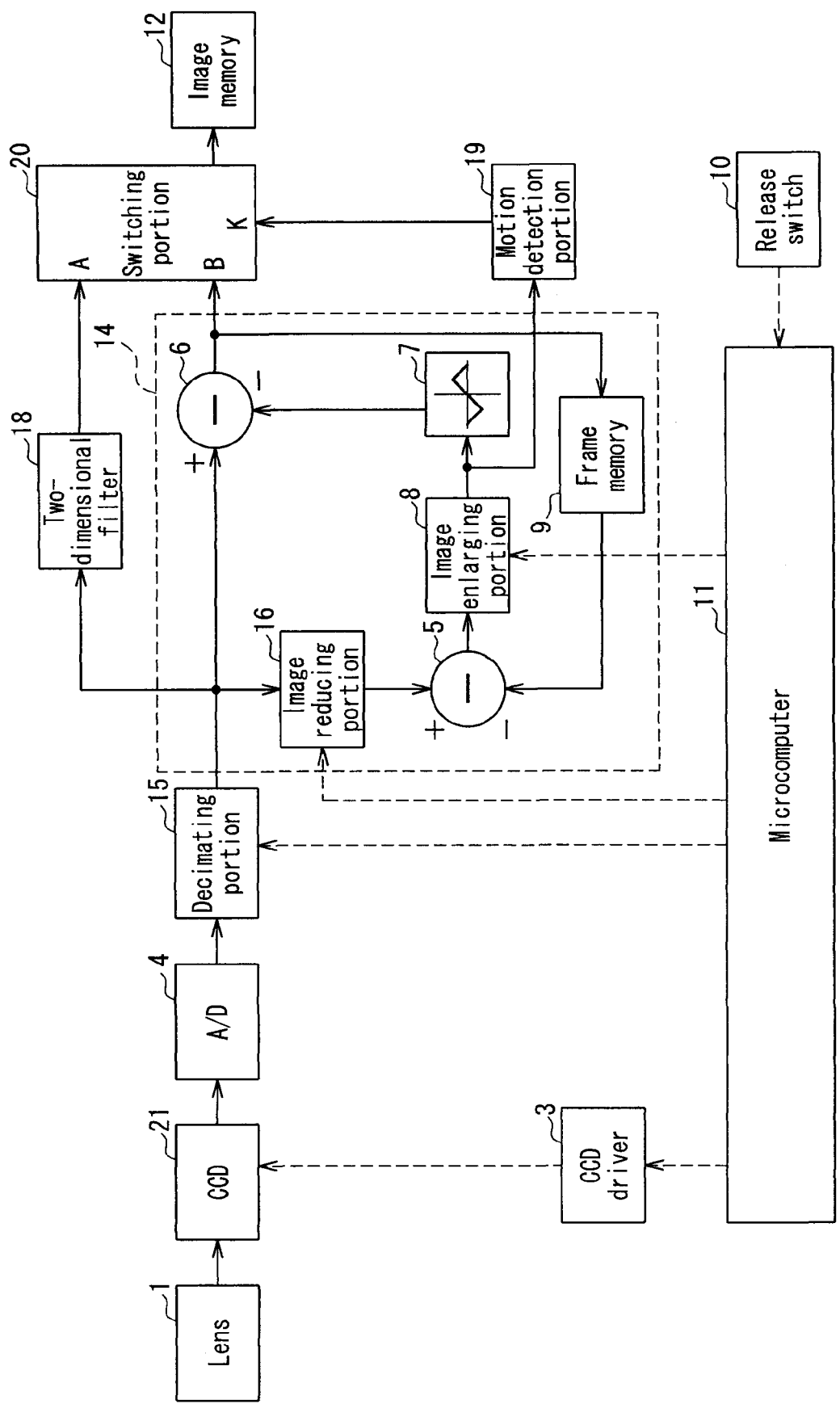
FIG. 15 is a block diagram of a further example of the image pickup apparatus according to embodiment 6.

Note that the CCD image sensor 2 may use an image pickup element that only can be driven in all-pixel reading mode. FIG. 15 shows a configuration in which the CCD image sensor 2 in FIG. 12 is replaced by the CCD image sensor 21, which only can be driven in all-pixel reading mode. This configuration further includes the decimating portion 15, which is operable in pixel mixing mode or all-pixel reading mode. The image pickup apparatus shown in FIG. 15 operates based on the timing chart shown in FIG. 2. FIG. 2(b), however, now shows the operations of the decimating portion 15. Pixel mixing mode is a mode in which low resolution image data is output by adding the horizontal and vertical pixels of the image data output from the A/D conversion unit 4. All-pixel reading mode is a mode in which image data input from the A/D conversion unit 4 is output without modification. Mode switching in the decimating portion 15 is controlled by the microcomputer 11.

Firstly, while the release switch 10 is not operated, the microcomputer 11 controls the decimating portion 15 to operate in pixel mixing mode, as shown in period 81 of FIG. 2. The image signal (resulting from all-pixel reading) output from the CCD image sensor 21 is digitized by the A/D conversion unit 4, and image data is output.

The decimating portion 15 performs pixel mixing on the image data output from the A/D conversion unit 4. Specifically, the decimating portion 15 effectively decimates the image data output from the A/D conversion unit 4 by adding pixels in the horizontal and vertical directions. That is, low resolution image data is output from the decimating portion 15. The image data output from the decimating portion 15 is input to the two-dimensional filter 18, the image reducing portion 16 and the second subtracter 6. Description of the subsequent operations, which are similar to the operations of the image pickup apparatus shown in FIG. 12, is omitted.

By causing the decimating portion 15 to operate in pixel mixing mode in period 81, the image size per frame is thus reduced, enabling high frame rate moving images to be obtained.

Next, when the release switch 10 is operated, the microcomputer 11 controls the CCD driver 3 to cause the CCD image sensor 21 to execute the exposure operation, as shown in period 82. After the end of period 82, the microcomputer 11 controls the CCD driver 3 to cause the CCD image sensor 21 to stop the exposure operation.

Next, when the exposure operation by the CCD image sensor 21 has ended, the microcomputer 11 controls the decimating portion 15 to operate in all-pixel reading mode, as shown in period 83. The decimating portion 15 thereby outputs the image data input from the CCD image sensor 21 via the A/D conversion unit 4 to the two-dimensional filter 18, the image reducing portion 16 and the second subtracter 6 without modification. That is, high resolution image data is output from the decimating portion 15. Description of the subsequent operations, which are similar to the operations of the image pickup apparatus shown in FIG. 12, is omitted.

According to the image pickup apparatus shown in FIG. 15, a reduction in costs can be achieved for the apparatus as a whole, since the CCD image sensor 21, which operates only in one operation mode (all-pixel reading mode in the present embodiment), is low cost in comparison to a CCD image sensor that can selectively operate in a plurality of operation modes.

The present invention, being capable of reducing random noise contained in images, is useful in image pickup apparatuses such as digital still cameras, video cameras, surveillance cameras, and mobile telephone terminals with built-in camera.

[Note 1]

An image pickup apparatus of the present invention comprises an image pickup element that includes a plurality of photoelectric conversion elements, and is operable in a first drive mode for reading a low resolution image based on an output of the photoelectric conversion elements or a second drive mode for reading a higher resolution image than the low resolution image, a drive unit that drives the image pickup element, a frame memory that stores image data read by the image pickup element in the first drive mode, an image enlarging portion that enlarges an image size of the image data stored in the frame memory, and a noise reduction unit that performs noise reduction on image data read by the image pickup element in the second drive mode, based on the image data enlarged by the image enlarging portion.

According to this configuration, high speed reading is performed by storing images read in the first reading mode in the frame memory, and random noise can be suppressed in a manner that takes into account subject motion and does not cause resolution degradation, by performing noise reduction on images read in the second drive mode based on images obtained by enlarging images stored in the frame memory.

Note that the CCD image sensor 2 is an exemplary image pickup element, the CCD driver 3 is an exemplary drive unit, pixel mixing mode is an exemplary first drive mode, and all-pixel reading mode is an exemplary second drive mode.

[Note 2]

The image pickup apparatus of the present invention may be configured such that the image pickup element, in the first drive mode, mixes the outputs of the plurality of photoelectric conversion elements, and outputs a result the mixing.

According to this configuration, a greater random noise suppression effect is obtained when performing noise reduction on images read in the second drive mode, since images with greatly suppressed random noise are obtained in the first drive mode.

[Note 3]

An image pickup apparatus of the present invention comprises an image pickup element that includes a plurality of photoelectric conversion elements, a drive unit that drives the image pickup element, a decimating portion that is operable in a first drive mode for generating a low resolution image based on an image output from the image pickup element or a second drive mode for generating a higher resolution image than the low resolution image, a frame memory that stores image data generated by the decimating portion in the first drive mode, an image enlarging portion that enlarges an image size of the image data stored in the frame memory, and a noise reduction unit that performs noise reduction on image data read by the image pickup element, based on the image data enlarged by the image enlarging portion.

According to this configuration, the cost of the image pickup apparatus can be cut because of the use of a low cost image pickup element that operates only in the second drive mode.

[Note 4]

The image pickup apparatus of the present invention may be configured such that the decimating portion, in the first drive mode, mixes the outputs of the plurality of photoelectric conversion elements read by the image pickup element and outputs a result of the mixing.

According to this configuration, a greater random noise suppression effect is obtained when performing noise reduction on image data read by the image pickup element, since images with greatly reduced random noise are obtained in the first drive mode.

[Note 5]

The image pickup apparatus of the present invention further may comprise a filtering unit that performs two-dimensional filtering on image data read by the decimating portion.

According to this configuration, a greater random noise suppression effect is obtained when performing noise reduction on image data read by the image pickup element, since images with greatly reduced random noise are obtained in comparison with when two-dimensional filtering is not performed. A significant random noise suppression effect is obtained with little circuitry, particularly because the number of photoelectric elements for undergoing two-dimensional filtering is increased without increasing the number of number of taps in the two-dimensional filter.

Note that the two-dimensional filter 13 is an exemplary filtering unit.

[Note 6]

An image pickup apparatus of the present invention comprises an image pickup element that includes a plurality of photoelectric conversion elements, and is operable in a first drive mode for reading a low resolution image based on an output of the photoelectric conversion elements or a second drive mode for reading a higher resolution image than the low resolution image, a drive unit that drives the image pickup element, a frame memory that stores image data read by the image pickup element in the first drive mode, an image reducing portion that reduces an image size of image data read by the image pickup element in the second drive mode, and a noise reduction unit that performs noise reduction on the image data read by the image pickup element in the second drive mode, based on the image data reduced by the image reducing portion. The noise reduction unit subtracts the image data stored in the frame memory from the image data reduced by the image reducing portion, enlarges image data resulting from the subtraction, and subtracts the enlarged image data from the image data read by the image pickup element in the second drive mode.

According to this configuration, it is possible to suppress the occurrence of spurious signals when random noise suppression is performed. Thus, image quality can be improved.

[Note 7]

An image pickup apparatus of the present invention comprises an image pickup element that includes a plurality of photoelectric conversion elements, a drive unit that drives the image pickup element, a decimating portion that is operable in a first drive mode for generating a low resolution image based on an image output from the image pickup element or a second drive mode for generating a higher resolution image than the low resolution image, a frame memory that stores image data generated by the decimating portion in the first drive mode, an image reducing portion that reduces an image size of image data generated by the decimating portion in the second drive mode, and a noise reduction unit that performs noise reduction on the image data generated by the decimating portion in the second drive mode, based on the image data reduced by the image reducing portion. The noise reduction unit subtracts the image data stored in the frame memory from the image data reduced by the image reducing portion, enlarges image data resulting from the subtraction, and subtracts the enlarged image data from the image data generated by the decimating portion in the second drive mode.

According to this configuration, it is possible to suppress the occurrence of spurious signals when random noise suppression is performed. Thus, image quality can be improved. Also, the cost of the image pickup apparatus can be cut because of being able to use a low cost image pickup element that operates only in the second drive mode.

[Note 8]

An image pickup apparatus of the present invention comprises an image pickup element that includes a plurality of photoelectric conversion elements, and is operable in a first drive mode for reading a low resolution image based on an output of the photoelectric conversion elements or a second drive mode for reading a higher resolution image than the low resolution image, a drive unit that drives the image pickup element, a frame memory that stores image data read by the image pickup element in the first drive mode, an image enlarging portion that enlarges an image size of the image data stored in the frame memory, and a filtering unit that performs low pass filtering on image data read by the image pickup element in the second drive mode, a first subtracter that subtracts the image data enlarged by the image enlarging portion from the image data filtered by the filtering unit, and a second subtracter that subtracts image data output from the first subtracter from the image data read by the image pickup element in the second drive mode.

According to this configuration, it is possible to suppress the occurrence of spurious signals when random noise suppression is performed. Thus, image quality can be improved.

Note that the two-dimensional filter 17 is an exemplary filtering unit.

[Note 9]

An image pickup apparatus of the present invention comprises an image pickup element that includes a plurality of photoelectric conversion elements, a drive unit that drives the image pickup element, a decimating portion that is operable in a first drive mode for generating a low resolution image based on an image output from the image pickup element or a second drive mode for generating a higher resolution image than the low resolution image, a frame memory that stores image data generated by the decimating portion in the first drive mode, an image enlarging portion that enlarges an image size of the image data stored in the frame memory, and a filtering unit that performs low pass filtering on image data generated by the decimating portion in the second drive mode, a first subtracter that subtracts the image data enlarged by the image enlarging portion from the image data filtered by the filtering unit, and a second subtracter that subtracts image data output from the first subtracter from the image data generated by the decimating portion in the second drive mode.

According to this configuration, it is possible to suppress the occurrence of spurious signals when random noise suppression is performed. Thus, image quality can be improved. Also, the cost of the image pickup apparatus can be cut because of being able to use a low cost image pickup element that operates only in the second drive mode.

[Note 10]

An image pickup apparatus of the present invention comprises an image pickup element that includes a plurality of photoelectric conversion elements, and is operable in a first drive mode for reading a low resolution image based on an output of the photoelectric conversion elements or a second drive mode for reading a higher resolution image than the low resolution image, a drive unit that drives the image pickup element, a filtering unit that performs two-dimensional filtering on image data read by image pickup element, a frame memory that stores image data read by the image pickup element in the first drive mode, an image reducing portion that reduces an image size of image data read by the image pickup element in the second drive mode, a first subtracter that subtracts the image data stored in the frame memory from the image data reduced by the image reducing portion, an image enlarging portion that enlarges an image size of image data output from the first subtracter, a second subtracter that subtracts the image data enlarged by the image enlarging portion from the image data read by the image pickup element in the second drive mode, a motion detection portion that detects image motion, based on the image data enlarged by the image enlarging portion, and a switching unit that adds the image data filtered by the filtering unit and image data output from the second subtracter at a prescribed ratio, based on a result of the detection by the motion detection portion, and outputs a result of the adding.

According to this configuration, degradation of the S/N ratio of images when there is significant image motion can be prevented by performing two-dimensional noise reduction with the filtering unit when there is significant image motion and performing three-dimensional noise reduction when there is little image motion.

Note that the two-dimensional filter 18 is an exemplary filtering unit.

[Note 11]

An image pickup apparatus of the present invention comprises an image pickup element that includes a plurality of photoelectric conversion elements, a drive unit that drives the image pickup element, a decimating portion that is operable in a first drive mode for generating a low resolution image based on an image output from the image pickup element or a second drive mode for generating a higher resolution image than the low resolution image, a filtering unit that performs two-dimensional filtering on image data generated by the decimating portion, a frame memory that stores image data generated by the decimating portion in the first drive mode, an image reducing portion that reduces an image size of image data generated by the decimating portion in the second drive mode, a first subtracter that subtracts the image data stored in the frame memory from the image data reduced by the image reducing portion, an image enlarging portion that enlarges an image size of image data output from the first subtracter, a second subtracter that subtracts the image data enlarged by the image enlarging portion from the image data generated by the decimating portion in the second drive mode, a motion detection portion that detects image motion, based on the image data enlarged by the image enlarging portion, and a switching unit that adds the image data filtered by the filtering unit and image data output from the second subtracter at a prescribed ratio, based on a result of the detection by the motion detection portion, and outputs a result of the adding.

According to this configuration, degradation of the S/N ratio of images when there is significant image motion can be prevented by performing two-dimensional noise reduction with the filtering unit when there is significant image motion and performing three-dimensional noise reduction when there is little image motion. Also, the cost of the image pickup apparatus can be cut because of the use of a low cost image pickup element that operates only in the second drive mode.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image pickup apparatus comprising:
   an image pickup element that includes a plurality of photoelectric conversion elements, and is operable in a first drive mode for reading a low resolution image based on an output of the photoelectric conversion elements or a second drive mode for reading a higher resolution image than the low resolution image;
   a drive unit that drives the image pickup element;
   a frame memory that stores image data read by the image pickup element in the first drive mode;
   an image enlarging portion that enlarges an image size of the image data read by the image pickup element in the first drive mode and stored in the frame memory; and
   a noise reduction unit that performs noise reduction on image data read by the image pickup element in the second drive mode, based on image data obtained by the image data read by the image pickup element in the first drive mode being enlarged by the image enlarging portion.

2. The image pickup apparatus according to claim 1, wherein the image pickup element, in the first drive mode, mixes the outputs of the plurality of photoelectric conversion elements, and outputs a result the mixing.

3. The image pickup apparatus according to claim 1, further comprising a filtering unit that performs two-dimensional filtering on image data read by image pickup element.

4. The image pickup apparatus according to claim 1, further comprising:
   an image reducing portion that reduces an image size of image data read by the image pickup element in the second drive mode, wherein
   the noise reduction unit, in the second drive mode, subtracts the image data stored in the frame memory from the image data reduced by the image reducing portion, enlarges image data resulting from the subtraction, and subtracts the enlarged image data from the image data read by the image pickup element.

5. The image pickup apparatus according to claim 1, further comprising:
   a filtering unit that performs low pass filtering on image data read by the image pickup element in the second drive mode,
   wherein the noise reduction unit, in the second drive mode,
   performs a first subtraction that subtracts the image data enlarged by the image enlarging portion from the image data filtered by the filtering unit, and
   performs a second subtraction that subtracts image data obtained by the first subtraction from the image data read by the image pickup element.

6. The image pickup apparatus according to claim 1, further comprising:
   a filtering unit that performs two-dimensional filtering on image data read by the image pickup element; and
   an image reducing portion that reduces an image size of image data read by the image pickup element in the second drive mode,
   wherein the noise reduction unit, in the second drive mode,
   performs a first subtraction that subtracts the image data stored in the frame memory from the image data reduced by the image reducing portion,
   enlarges an image size of image data obtained by the first subtraction,
   performs a second subtraction that subtracts the image data enlarged by the image enlarging portion from the image data read by the image pickup element in the second drive mode,
   detects image motion, based on the image data enlarged by the image enlarging portion, and
   adds the image data filtered by the filtering unit and image data obtained by the second subtraction at a prescribed ratio, based on a result of the detection by the motion detection portion, and outputs a result of the adding.

* * * * *

UNITED STATES PATENT AND TRADEMARK OFFICE
CERTIFICATE OF CORRECTION

| | | |
|---|---|---|
| PATENT NO. | : 7,898,581 B2 | |
| APPLICATION NO. | : 11/745714 | |
| DATED | : March 1, 2011 | |
| INVENTOR(S) | : Yukihiro Tanizoe | |

It is certified that error appears in the above-identified patent and that said Letters Patent is hereby corrected as shown below:

Column 27, line 24, "...a result the mixing" should read -- a result of the mixing --.

Signed and Sealed this
Fifth Day of July, 2011

David J. Kappos
*Director of the United States Patent and Trademark Office*